US012639558B2

(12) United States Patent
Paramasivam et al.

(10) Patent No.: US 12,639,558 B2
(45) Date of Patent: May 26, 2026

(54) NEURAL NETWORK PROCESSOR SYSTEM AND METHODS OF OPERATING AND FORMING THEREOF

(71) Applicant: Agency for Science, Technology and Research, Singapore (SG)

(72) Inventors: Vishnu Paramasivam, Singapore (SG); Anh Tuan Do, Singapore (SG); Eng Kiat Koh, Singapore (SG); Junran Pu, Singapore (SG); Fei Li, Singapore (SG); Aarthy Mani, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 911 days.

(21) Appl. No.: 17/638,748

(22) PCT Filed: Sep. 3, 2019

(86) PCT No.: PCT/SG2019/050440
§ 371 (c)(1),
(2) Date: Feb. 25, 2022

(87) PCT Pub. No.: WO2021/045676
PCT Pub. Date: Mar. 11, 2021

(65) Prior Publication Data
US 2022/0222513 A1      Jul. 14, 2022

(51) Int. Cl.
*G06N 3/063*      (2023.01)
*G06N 3/049*      (2023.01)

(52) U.S. Cl.
CPC ............. *G06N 3/063* (2013.01); *G06N 3/049* (2013.01)

(58) Field of Classification Search
CPC ................................ G06N 3/063; G06N 3/049
(Continued)

(56) References Cited

U.S. PATENT DOCUMENTS 4,094,079 A  *  6/1978  Dorsett .................. G09B 5/065
                                                            434/307 R
4,874,963 A    10/1989  Alspector
(Continued)

FOREIGN PATENT DOCUMENTS

CN          109308281 A  *  2/2019
CN          109542830 A      3/2019
WO      2018215023 A1    11/2018

OTHER PUBLICATIONS

Smaragdos G, Chatzikonstantis G, Kukreja R, Sidiropoulos H, Rodopoulos D, Sourdis I, Al-Ars Z, Kachris C, Soudris D, De Zeeuw CI, Strydis C. BrainFrame: a node-level heterogeneous accelerator platform for neuron simulations. J Neural Eng. Dec. 2017;14 (Year: 2017).*

(Continued)

*Primary Examiner* — Austin Hicks
(74) *Attorney, Agent, or Firm* — Shackelford, McKinley & Norton, LLP

(57)                    ABSTRACT

There is provided a neural network processor system including: a plurality of neural processing units, including a first neural processing unit and a second neural processing unit, whereby each neural processing unit comprises an array of neural processing core blocks, each neural processing core block comprising a neural processing core; and at least one central processing unit communicatively coupled to the plurality of neural processing units and configured to coordinate the plurality of neural processing units for performing neural network computations. In particular, the first and second neural processing units have a different structural configuration to each other. There is also provided a corresponding method of operating and a corresponding method of forming the neural network processor system.

11 Claims, 17 Drawing Sheets

(58) Field of Classification Search
USPC .......................................................... 706/25
See application file for complete search history.

(56) References Cited

U.S. PATENT DOCUMENTS

| | | | |
|---|---|---|---|
| 6,351,784 B1 | 2/2002 | Neal et al. | |
| 8,311,965 B2 | 11/2012 | Breitwisch et al. | |
| 9,710,265 B1 | 7/2017 | Temam et al. | |
| 10,002,108 B2 | 6/2018 | Herrero Abellanas et al. | |
| 2007/0273699 A1* | 11/2007 | Sasaki | G06F 9/3879 |
| | | | 345/502 |
| 2013/0073497 A1 | 3/2013 | Akopyan et al. | |
| 2015/0302294 A1 | 10/2015 | Modha | |
| 2018/0052709 A1* | 2/2018 | Fong | G06F 9/5044 |
| 2018/0157968 A1 | 6/2018 | Henry et al. | |
| 2018/0307973 A1 | 10/2018 | Fang et al. | |
| 2019/0236437 A1 | 8/2019 | Shin et al. | |
| 2020/0074272 A1* | 3/2020 | Okazawa | G06N 3/065 |
| 2020/0242452 A1* | 7/2020 | Tschirhart | G06N 3/063 |
| 2020/0294180 A1* | 9/2020 | Koker | G06T 1/20 |

OTHER PUBLICATIONS

International Search Report for International Application No. PCT/SG2019/050440 dated Nov. 18, 2019, pp. 1-4.
Written Opinion of the International Searching Authority for International Application No. PCT/SG2019/050440 dated Nov. 18, 2019, pp. 1-5.
Kumar et al., "Single-ISA Heterogeneous Multi-Core Architectures for Multithreaded Workload Performance," 31st Annual International Symposium on Computer Architecture (ISCA'04), Munchen, Germany, Jun. 19-23, 2004, pp. 1-28.
Wikipedia, "Hardware Acceleration," https://en.wikipedia.org/wiki/Hardware_acceleration, 2025, pp. 1-7.
Scale Computing, "What is a GPU Cluster? Understanding Architecture, Nodes, and Use Cases," Apr. 16, 2025, pp. 1-10.
Mitac Computing, "TYAN Launches AI-Optimized Server Platforms Powered by Nvidia V100S Tensor Core GPUs," https://www.mitaccomputing.com/en-US@TYAN_Launches_AI-Optimized_Server_Platforms_Powered_by_NVIDIA_V100S_Tensor_Core_GPUs~PRDetail, 2025, pp. 1-7.

* cited by examiner

200

300

519

NEURAL NETWORK PROCESSOR SYSTEM AND METHODS OF OPERATING AND FORMING THEREOF

TECHNICAL FIELD

The present invention generally relates to a neural network processor system, a method of operating the neural network processor system and a method of forming the neural network processor system.

BACKGROUND

There exist various conventional hardware implementations of artificial neural networks (ANNs), which may also be referred to as hardware neural networks (HNNs) or neural network processor systems. It is known in the art that ANNs are, to at least some extent, inspired by biological neural networks associated with a biological brain. For example, an ANN may be based on a collection of connected units or nodes, which may be referred to as artificial neurons or neuron elements (or simply as neurons), which may be modelled based on the neurons in a biological brain. Each connection between artificial neurons, like the synapses in a biological brain, can transmit a signal from one artificial neuron (pre-synaptic neuron) to another (post-synaptic neuron). An artificial neuron that receives a signal may then process the signal and then signal additional artificial neuron(s) connected thereto.

For example, in various conventional ANN implementations, the signal at a connection between artificial neurons may be a number, and the output of each artificial neuron may be computed by a non-linear function of the sum of its inputs. The connections between artificial neurons may be referred to as edges or synapses. The edges may have a weight (synaptic weight) associated thereto that adjusts as learning proceeds. The weight may increase or decrease the strength of the signal at a connection. Artificial neurons may have a threshold such that a signal is only sent (or triggered) if the aggregate signal crosses the threshold. In addition, artificial neurons may be aggregated into layers. Different layers may perform different kinds of transformations on their inputs. For example, signals may travel from the first layer (the input layer) to the last layer (the output layer), possibly after traversing the layers multiple times.

In various conventional hardware implementations of artificial neural networks (ANNs), each neural processing core (which may also be referred to as "neurocore" herein) in the conventional neural network processor system is identical (i.e., has the same structural configuration), which may be referred to as being homogeneous. However, such conventional neural network processor systems may suffer from various efficiency and/or effectiveness issues when executing various neural network applications.

A need therefore exists to provide a neural network processor system and related methods that seek to overcome, or at least ameliorate, one or more of the deficiencies of conventional neural network processor systems, such as but not limited to, improving efficiency and/or effectiveness in performing neural network computations associated with one or more neural network applications. It is against this background that the present invention has been developed.

SUMMARY

According to a first aspect of the present invention, there is provided a neural network processor system comprising:

a plurality of neural processing units, including a first neural processing unit and a second neural processing unit, wherein each neural processing unit comprises an array of neural processing core blocks, each neural processing core block comprising a neural processing core; and at least one central processing unit communicatively coupled to the plurality of neural processing units and configured to coordinate the plurality of neural processing units for performing neural network computations, wherein the first and second neural processing units have a different structural configuration to each other.

According to a second aspect of the present invention, there is provided a method of operating a neural network processor system, the neural network processor system comprising:

a plurality of neural processing units, including a first neural processing unit and a second neural processing unit, wherein each neural processing unit comprises an array of neural processing core blocks, each neural processing core block comprising a neural processing core; and at least one central processing unit communicatively coupled to the plurality of neural processing units and configured to coordinate the plurality of neural processing units for performing neural network computations, wherein the first and second neural processing units have a different structural configuration to each other; and the method comprising:

executing, by the at least one central processing unit, one or more neural network applications;

assigning, by the at least one central processing unit, a plurality of neural network tasks obtained from the one or more neural network applications to the plurality of neural processing units;

wherein each of the plurality of neural network tasks is assigned to one or more of the plurality of neural processing units for performing neural network computations associated with the neural network tasks based on the structural configuration of the one or more neural processing units.

According to a third aspect of the present invention, there is provided a method of forming a neural network processor system, the method comprising:

forming a plurality of neural processing units, including a first neural processing unit and a second neural processing unit, wherein each neural processing unit comprises an array of neural processing core blocks, each neural processing core block comprising a neural processing core; and forming at least one central processing unit communicatively coupled to the plurality of neural processing units and configured to coordinate the plurality of neural processing units for performing neural network computations, wherein the first and second neural processing units have a different structural configuration to each other.

BRIEF DESCRIPTION OF THE DRAWINGS

Embodiments of the present invention will be better understood and readily apparent to one of ordinary skill in the art from the following written description, by way of example only, and in conjunction with the drawings, in which.

DETAILED DESCRIPTION

Various embodiments of the present invention provide a neural network processor system, a method of operating the neural network processor system and a method of forming the neural network processor system.

For example, as described in the background, conventional neural network processor systems may suffer from various efficiency and/or effectiveness issues when executing various neural network applications. In this regard, various embodiments of the present invention provide a neural network processor system and related methods, such as a method of operation the neural network processor system and a method of forming the neural network processor system described herein, that seek to overcome, or at least ameliorate, one or more of the deficiencies of conventional neural network processor systems, such as but not limited to, improving efficiency and/or effectiveness in performing neural network computations associated with one or more neural network applications.

Figure 1:
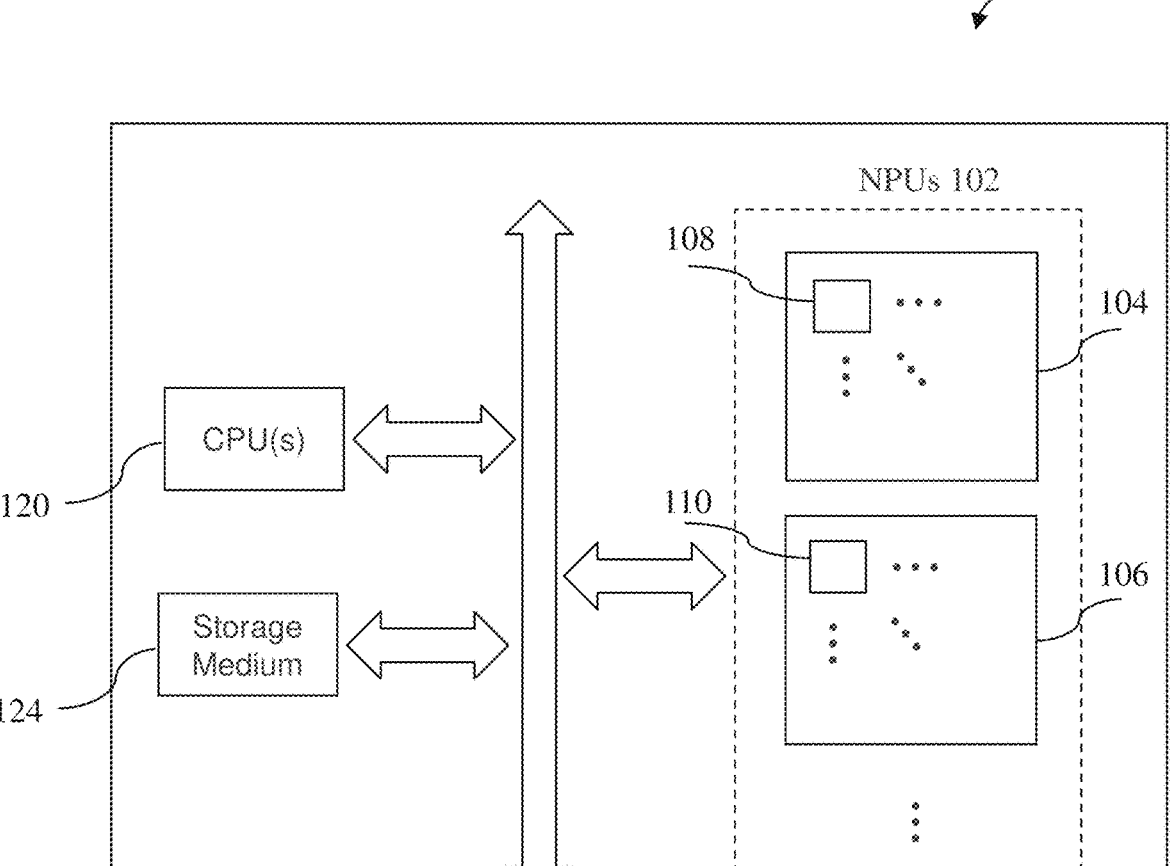
FIG. 1 depicts a schematic drawing of a neural network processor system, according to various embodiments of the present invention.

FIG. 1 depicts a schematic drawing of a neural network processor system 100 according to various embodiments of the present invention. The neural network processor system 100 comprises: a plurality of neural processing units (NPUs) 102, including a first neural processing unit (first NPU) 104 and a second neural processing unit (second NPU) 106, whereby each neural processing unit comprises an array (or a set) of neural processing core blocks 108, 110, each neural processing core block 108, 110 comprising a neural processing core (not shown in FIG. 1); and at least one central processing unit (CPU) 120 communicatively coupled to the plurality of neural processing units 102 and configured to coordinate the plurality of neural processing units 102 for performing neural network computations. In particular, the first and second neural processing units 104, 106 have a different structural configuration to each other.

Accordingly, the neural network processor system 100 according to various embodiments is advantageously configured with neural processing units 102 (e.g., at least a first neural processing unit 104 and a second neural processing unit 106) having different structural configurations, which may be referred to as being heterogeneous (in other words, heterogeneous neural processing units or a heterogeneous neural network processor system). In this regard, configuring neural processing units 102 to have different structural configurations advantageously enable the CPU(s) 120 to assign neural network tasks (or neural network operations) obtained (or derived) from one or more neural network applications to the plurality of neural processing units 102 such that each neural network task is assigned to one or more of the plurality of neural processing units based on the structural configuration of the one or more neural processing units (e.g., one or more neural processing units selected or determined based on their structural configuration). For example, each neural network task may thus be assigned to one or more neural processing units determined to be the most suitable or appropriate (e.g., amongst the plurality of neural processing units 102) for performing (or executing) the neural network task based on the structural configuration of the one or more neural processing units. As a result, the neural network computations associated with the neural network tasks obtained from the neural network applications may thus be more efficiently and/or effectively performed by the plurality of neural processing units 102, resulting a neural network processor system 100 with improved efficiency and/or effectiveness in performing neural network computations associated with one or more neural network applications.

In various embodiments, at least two of the plurality of neural processing units have a different structural configuration to each other. In various embodiments, each of the plurality neural processing units has a different structural configuration amongst the plurality of neural processing units.

In various embodiments, the different structural configuration comprises a different size (e.g., such as corresponding to a different processing capacity). In various embodiments, neural processing units having a different size to each other may refer to at least one of the number of neural processing blocks (e.g., which may be referred to as unit size) and the size of each neural processing core (i.e., the neural processing core of each neural processing core block) (e.g., which may be referred to as core size) in the respective neural processing unit. In other words, different size (e.g., different physical size) in the neural processing units may refer to either the number of neural processing blocks (unit size) or the size of each neural processing core (core size) in the respective neural processing unit, or a combination thereof. Accordingly, for example, each neural network task may be assigned to one or more of the plurality of neural processing units based on the size of the one or more neural processing units (e.g., one or more neural processing units selected or determined based on their size). For example, each neural network task may be assigned to one or more neural processing units determined to be the most suitable or appropriate (e.g., amongst the plurality of neural processing units 102) for performing (or executing) the neural network task based on the size of the one or more neural processing units, such as with respect to the size (e.g., number of neurons (e.g., represented by nodes)) of the network layer associated with the neural network task. By way of example only and without limitation, a neural network task associated with a network layer having a large number of neurons assigned to one or more neural processing units 102 having a size that is correspondingly large, thus advantageously improving efficiency and/or effectiveness (e.g., improve hardware utilization) in performing neural network computations associated with the neural network task.

The present invention is not limited to the neural processing unit having any specific (or particular) structural configuration (e.g., specific size). For example, the specific size of the neural processing unit may be configured as desired or as appropriate based on various factors, such as based on a size (e.g., number of neurons) of a network layer which the neural processing unit is intended or designed to process or mapped to.

In various embodiments, within each of the plurality of neural processing units 102, each neural processing core has the same size. In other words, within each of the plurality of neural processing units 102, the neural processing cores all have the same size. By way of an example, each neural processing core in the above-mentioned first neural processing unit 104 may have a first size and each neural processing core in the above-mentioned second neural processing unit 106 may have a second size. In various embodiments, the size (e.g., corresponding to processing capacity) of the neural processing core (or core size) may refer to the number of neurons (artificial neurons, which may be embodied as neuron elements/circuit) in the neural processing core.

In various embodiments, the neural network processor system 100 further comprises a fabric bridge (not shown in FIG. 1). In this regard, the at least one central processing unit 120 is communicatively coupled to the plurality of neural processing units 102 via the fabric bridge (the same fabric bridge). By way of an example and without limitation, the plurality of neural processing units 102 may be arranged or cascaded in series, each being communicatively coupled to the fabric bridge (e.g., the plurality of neural processing units 102 being communicatively coupled to the fabric bridge in series). In other words, each of the plurality of neural processing units 102 is communicatively coupled to the at least one central processing unit 120 via the same fabric bridge.

In various other embodiments, the neural network processor system 100 further comprises a plurality of fabric bridges (not shown in FIG. 1), whereby the at least one central processing unit is communicatively coupled to the plurality of neural processing units 102 via the plurality of fabric bridges, respectively. By way of an example and without limitation, the plurality of neural processing units 102 may be arranged in parallel, each being communicatively coupled to a respective one of the plurality of fabric bridges 102. In other words, each of the plurality of neural processing units 102 is communicatively coupled to the at least one central processing unit 120 via a respective one of the plurality of fabric bridges.

In various other embodiments, a plurality of groups of neural processing units 102 may be arranged in parallel, each group being communicatively coupled to a respective one of the plurality of fabric bridges, whereby each group comprises one or more neural processing units arranged in series or in tiles.

In various embodiments, the neural network processor system 100 further comprises a router network (not shown in FIG. 1), whereby the at least one central processing unit 120 is communicatively coupled to the plurality of neural processing units 102 further based on the router network. For example, in embodiments whereby the at least one central processing unit 120 is communicatively coupled to the plurality of neural processing units 102 via a fabric bridge (the same fabric bridge), the router network may be communicatively coupled to the at least one central processing unit 120 via the fabric bridge.

In various embodiments, the router network comprises a plurality of router subnetworks associated with the plurality of neural processing units, respectively. Each of the plurality of router subnetworks comprises a plurality of routers communicatively coupled to the plurality of neural processing cores, respectively, of the neural processing unit associated therewith. In other words, each neural processing unit has a router subnetwork associated therewith, the router subnetwork comprises a plurality of routers communicatively coupled to the plurality of neural processing cores, respectively, of the neural processing unit. Accordingly, each of the plurality of neural processing cores in the neural processing unit is configured to communicate with other one or more neural processing cores via the router coupled to (and associated with) the neural processing core.

In various embodiments, the router network further comprises a plurality of global routers associated with the plurality of neural processing units, respectively, the plurality of global routers being communicatively coupled to the plurality of router subnetworks associated with the plurality of neural processing units 102, respectively. In this regard, the router network is configured to route neural data to and/or from each of the plurality of neural processing units

102 via the respective global router associated therewith. For example, in embodiments whereby the plurality of neural processing units 102 are arranged in series, each of the plurality of global routers may thus be arranged in series and communicatively coupled to the fabric bridge (e.g., the plurality of global routers being communicatively coupled to the fabric bridge in series). The plurality of neural processing units 102 may thus communicate with each other via the respective global routers associated therewith. For example, communication from a neural processing core in a first neural processing unit to another neural processing core in a second neural processing unit may thus be routed from the router subnetwork associated with the first neural processing unit, to the global router associated with the first neural processing unit, then to the global router associated with the second neural processing unit, then to the router subnetwork associated with the second neural processing unit.

In various embodiments, the plurality of routers of each of the plurality of router subnetworks are each configured to communicate with neighboring routers and the corresponding neural processing core based on an asynchronous interface.

In various embodiments, each of the plurality of neural processing units further comprises a neural cache block (not shown in FIG. 1), the neural cache block comprises a memory buffer configured to buffer neural data.

In various embodiments, the neural cache block further comprises a spike generator configured to generate time-based ordered spike data based on an input data from the central processing unit and transmit the time-based ordered spike data to the memory buffer for storage therein and subsequent transmission.

In various embodiments, each neural processing core of each neural processing unit comprises a memory synapse array configured to perform in-memory neural network computations; and a plurality of neuron communicatively coupled to the memory synapse array.

In various embodiments, each neural processing core block of each neural processing unit further comprises a local clock generator configured to perform self clock gating operations. Accordingly, in various embodiments, the neural processing core blocks in the neural network processor system each has an asynchronous interface. In other words, the neural processing core blocks in the neural network processor system are globally asynchronous, or have a globally asynchronous interface.

In various embodiments, each neural processing core block of each neural processing unit further comprises a local power gating structure (individual power gating structure) configured to control power supply to the neural processing core therein.

Accordingly, in various embodiments, each neural processing core block has its own power management structure and a local clock generator, for supporting self power and clock gating. Accordingly, in various embodiments, each neural processing core block may be configured to be operable in a plurality of operating modes, comprising a disable mode, a standby mode and an active mode. As a result, the neural network processor system 100 according to various embodiments has significantly improved power consumption (e.g., significantly reduced or minimised).

In various embodiments, in each of the plurality of neural processing units, the array of neural processing core blocks is a two-dimensional (2D) array (comprising rows and columns) and each neural processing core block has an associated unique address based on its position in the 2D array. For example, each neural processing core block may have an address based on the row and column which it is located in the 2D array.

Figure 2:
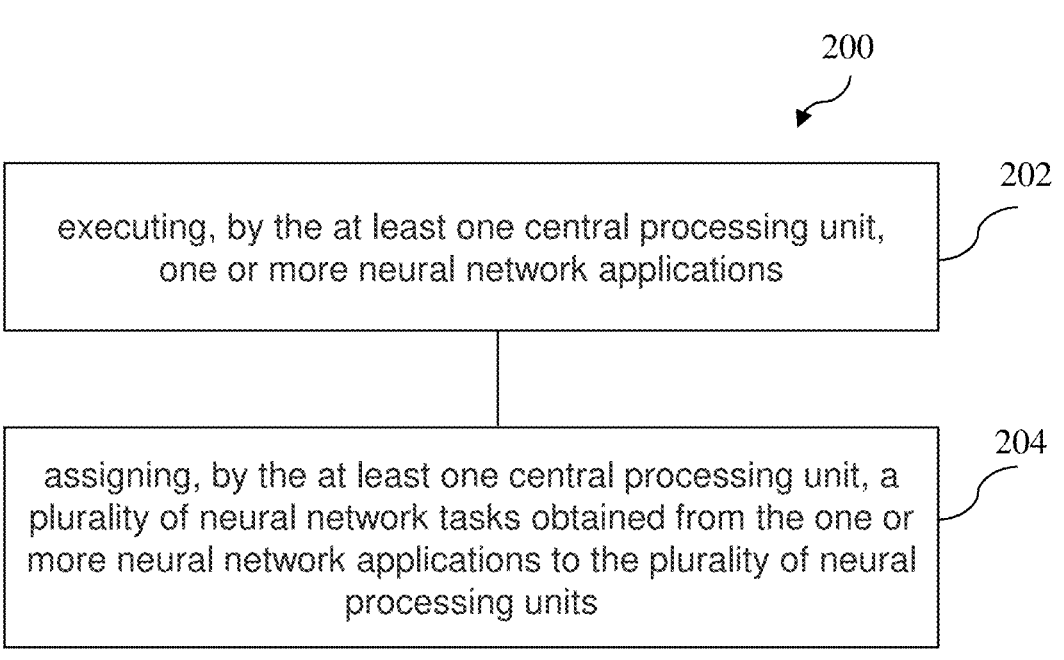
FIG. 2 depicts a flow diagram of a method of operating a neural network processor system, according to various embodiments of the present invention.

FIG. 2 depicts a flow diagram of a method 200 of operating a neural network processor system according to various embodiments of the present invention, such as the neural network processor system 100 as described hereinbefore with reference to FIG. 1 according to various embodiments. The method 200 comprises: executing (at 202), by the at least one central processing unit 120, one or more neural network applications; and assigning (at 204), by the at least one central processing unit 120, a plurality of neural network tasks obtained from the one or more neural network applications to the plurality of neural processing units 102. In particular, each of the plurality of neural network tasks is assigned to one or more of the plurality of neural processing units for performing neural network computations associated with the neural network tasks based on the structural configuration of the neural processing unit. The results of the neural network computations may then be transmitted back to the at least one central processing unit 120 for further processing based on the one or more neural network applications.

In various embodiments, as described hereinbefore, the different structural configuration comprises a different size.

For example, as described hereinbefore according to various embodiments, each neural network task may be assigned to one or more of the plurality of neural processing units based on the size of the one or more neural processing units (e.g., one or more neural processing units selected or determined based on their size). For example, each neural network task may be assigned to one or more neural processing units determined to be the most suitable or appropriate (e.g., amongst the plurality of neural processing units 102) for performing (or executing) the neural network task based on the size of the one or more neural processing units, such as with respect to the size (e.g., number of neurons) of the network layer associated with the neural network task. By way of example only and without limitation, a neural network task associated with a network layer having a large number of neurons assigned to one or more neural processing units 102 having a size that is correspondingly large, thus advantageously improving efficiency and/or effectiveness (e.g., improve hardware utilization) in performing neural network computations associated with the neural network task.

Figure 3A:
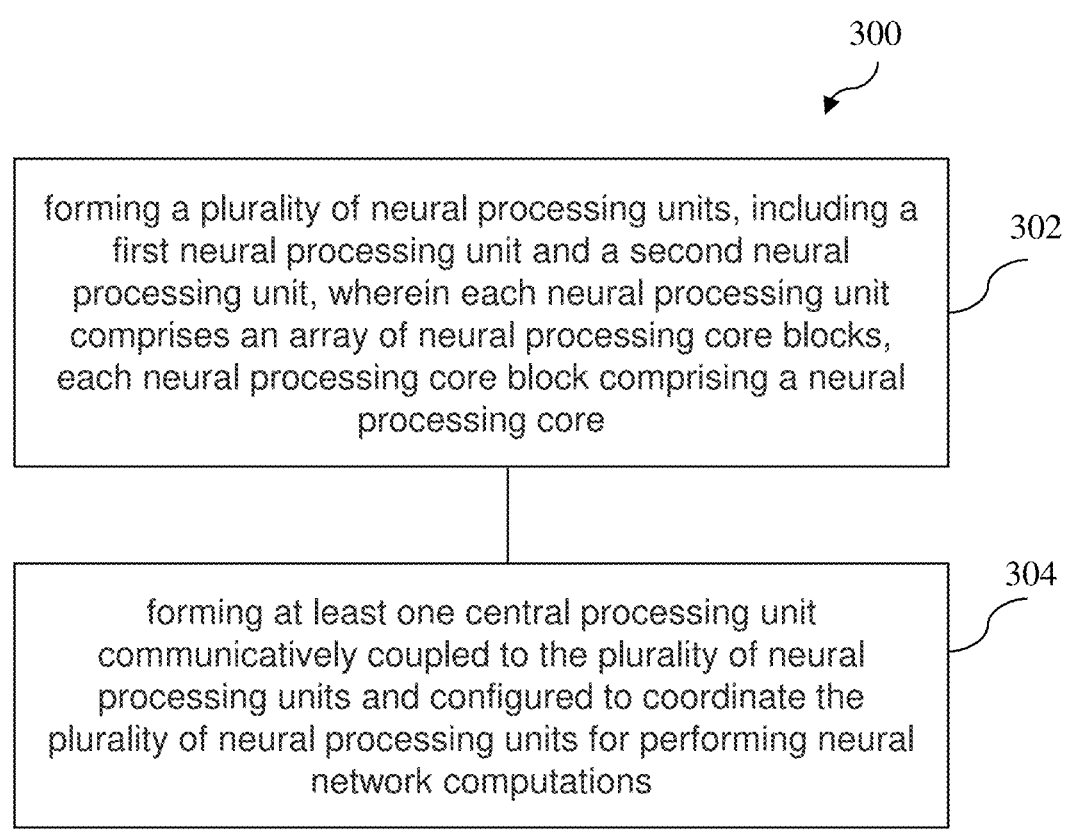
FIG. 3A depicts a flow diagram of a method of forming a neural network processor system, according to various embodiments of the present invention.

FIG. 3A depicts a flow diagram of a method 300 of forming a neural network processor system according to various embodiments of the present invention, such as the neural network processor system 100 as described hereinbefore with reference to FIG. 1 according to various embodiments. The method 300 comprises: forming (at 302) a plurality of neural processing units, including a first neural processing unit and a second neural processing unit, wherein each neural processing unit comprises an array of neural processing core blocks, each neural processing core block comprising a neural processing core; and forming (at 304) at least one central processing unit communicatively coupled to the plurality of neural processing units and configured to coordinate the plurality of neural processing units for performing neural network computations. In particular, the first and second neural processing units have a different structural configuration to each other.

In various embodiments, as described hereinbefore, the different structural configuration comprises a different size.

Figure 3B:
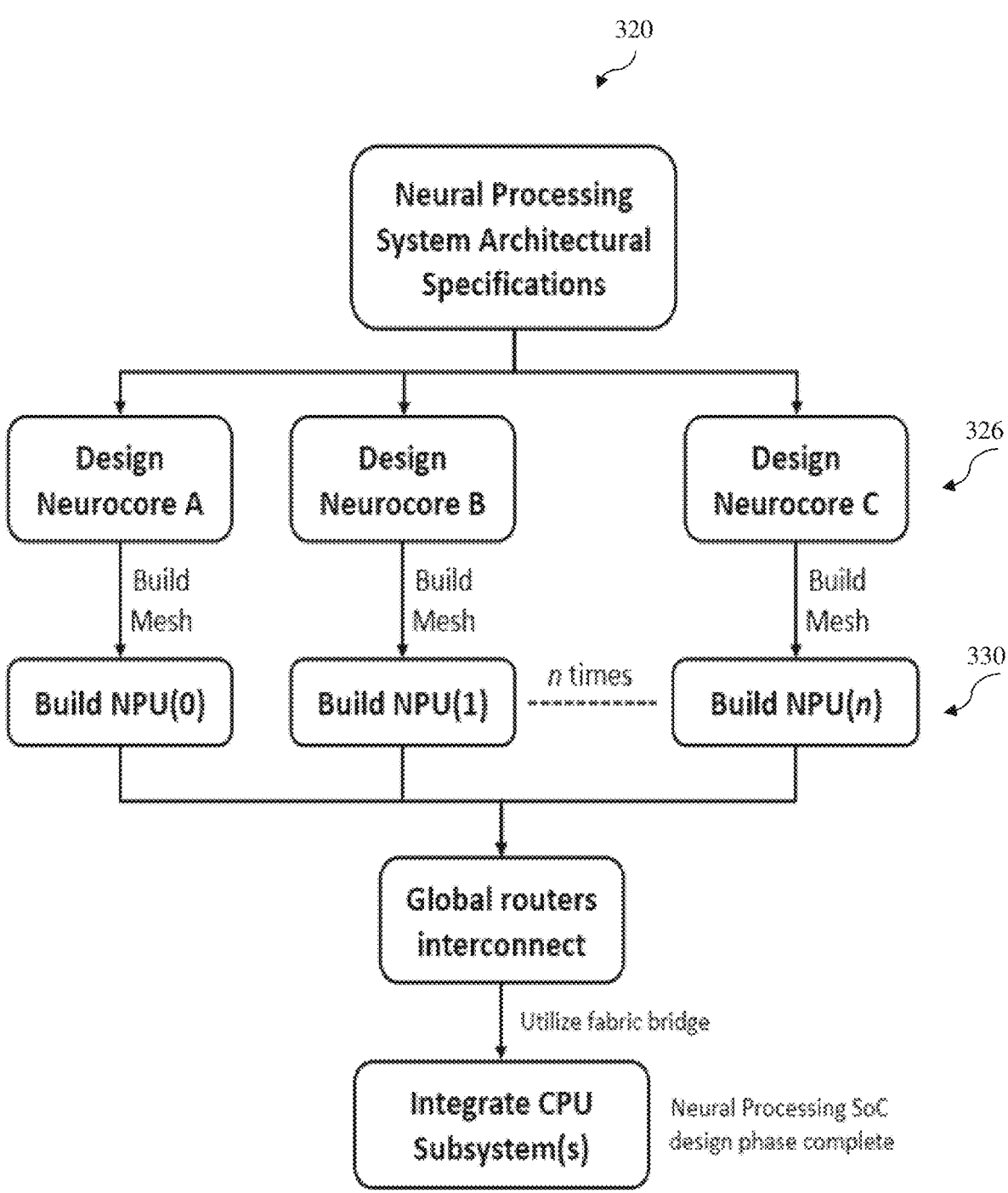
FIG. 3B depicts a flow diagram of an exemplary method of forming a neural network processor system, according to various example embodiments of the present invention.

By way of an example only and without limitation, FIG. 3B depicts a flow diagram of an exemplary method 320 of forming a neural network processor system according to various example embodiments of the present invention. The method 320 comprises obtaining (at 322) architectural specifications for the neural network processor system desired to be configured/formed according to various example embodiments of the present invention. For example, requirements associated with the architectural specifications may be obtained from an application developer, and the requirements may then be translated (or transformed) into NPU specifications. With these NPU specifications, the individual neural processing core blocks for each NPU may then be formed or designed (at 326). As described hereinbefore, each NPU may include an array of neural processing core blocks (e.g., repeating units of neural processing core blocks in the array), and the NPUs have different structural configuration to each other (e.g., different array sizes). At the circuit level, neural processing core blocks associated with each NPU may be algorithmically stitched together as a mesh (or array) to form the respective NPU (i.e., design automation) (at 330), which can significantly simplify engineering effort. Subsequently, the NPUs may be connected to each other (e.g., via global routers) (at 334), and may then be connected to a CPU subsystem (at 338).

In various embodiments, the neural network processor system 100 may be formed as an integrated neural processing circuit. The neural network processor system 100 may also be embodied as a device or an apparatus.

A computing system, a controller, a microcontroller or any other system providing a processing capability may be presented according to various embodiments in the present disclosure. Such a system may be taken to include one or more processors and one or more computer-readable storage mediums. For example, the neural network processor system 100 described hereinbefore may include a number of processing units (e.g., CPU(s) 120 and NPUs 102) and one or more computer-readable storage medium (or memory) 124 which are for example used in various processing carried out therein as described herein. A memory or computer-readable storage medium used in various embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g., a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with various alternative embodiments. Similarly, a "module" may be a portion of a system according to various embodiments in the present invention and may encompass a "circuit" as above, or may be understood to be any kind of a logic-implementing entity therefrom.

Some portions of the present disclosure are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "executing", "assigning", "processing", or the like, refer to the actions and processes of a computer system, or similar electronic device, that manipulates and transforms data represented as physical quantities within the computer system into other data similarly represented as physical quantities within the computer system or other information storage, transmission or display devices.

The present specification also discloses a system (e.g., which may also be embodied as a device or an apparatus) for performing the operations/functions of the method(s) described herein. Such a system or apparatus may be specially constructed for the required purposes, or may comprise a general purpose computer or other device selectively activated or reconfigured by a computer program stored in the computer. The algorithms presented herein are not inherently related to any particular computer or other apparatus. Various general purpose machines may be used with computer programs in accordance with the teachings herein. Alternatively, the construction of more specialized apparatus to perform the required method steps may be appropriate.

In addition, the present specification also at least implicitly discloses a computer program or software/functional module, in that it would be apparent to the person skilled in the art that the individual steps of the methods described herein may be put into effect by computer code. The computer program is not intended to be limited to any particular programming language and implementation thereof. It will be appreciated that a variety of programming languages and coding thereof may be used to implement the methods/techniques of the disclosure contained herein. Moreover, the computer program is not intended to be limited to any particular control flow. There are many other variants of the computer program, which can use different control flows without departing from the spirit or scope of the invention. It will be appreciated to a person skilled in the art that various modules may be software module(s) realized by computer program(s) or set(s) of instructions executable by a computer processor to perform the required functions, or may be hardware module(s) being functional hardware unit(s) designed to perform the required functions. It will also be appreciated that a combination of hardware and software modules may be implemented.

Furthermore, one or more of the steps of the computer program/module or method may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer program when loaded and executed on such a general-purpose computer effectively results in an apparatus that implements the steps of the methods described herein.

In various embodiments, there is provided a computer program product, embodied in one or more computer-readable storage mediums (non-transitory computer-readable storage medium), comprising instructions executable by one or more computer processors (e.g., the CPU(s) 120) to perform a method 300 of operating a neural network processor system as described hereinbefore with reference to FIG. 3A. Accordingly, various computer programs or modules described herein may be stored in a computer program product receivable by a system therein for execution by at least one processor 120 of the system to perform the respective functions.

The software or functional modules described herein may also be implemented as hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the software or functional module(s) described herein can also be implemented as a combination of hardware and software modules.

Figure 4:
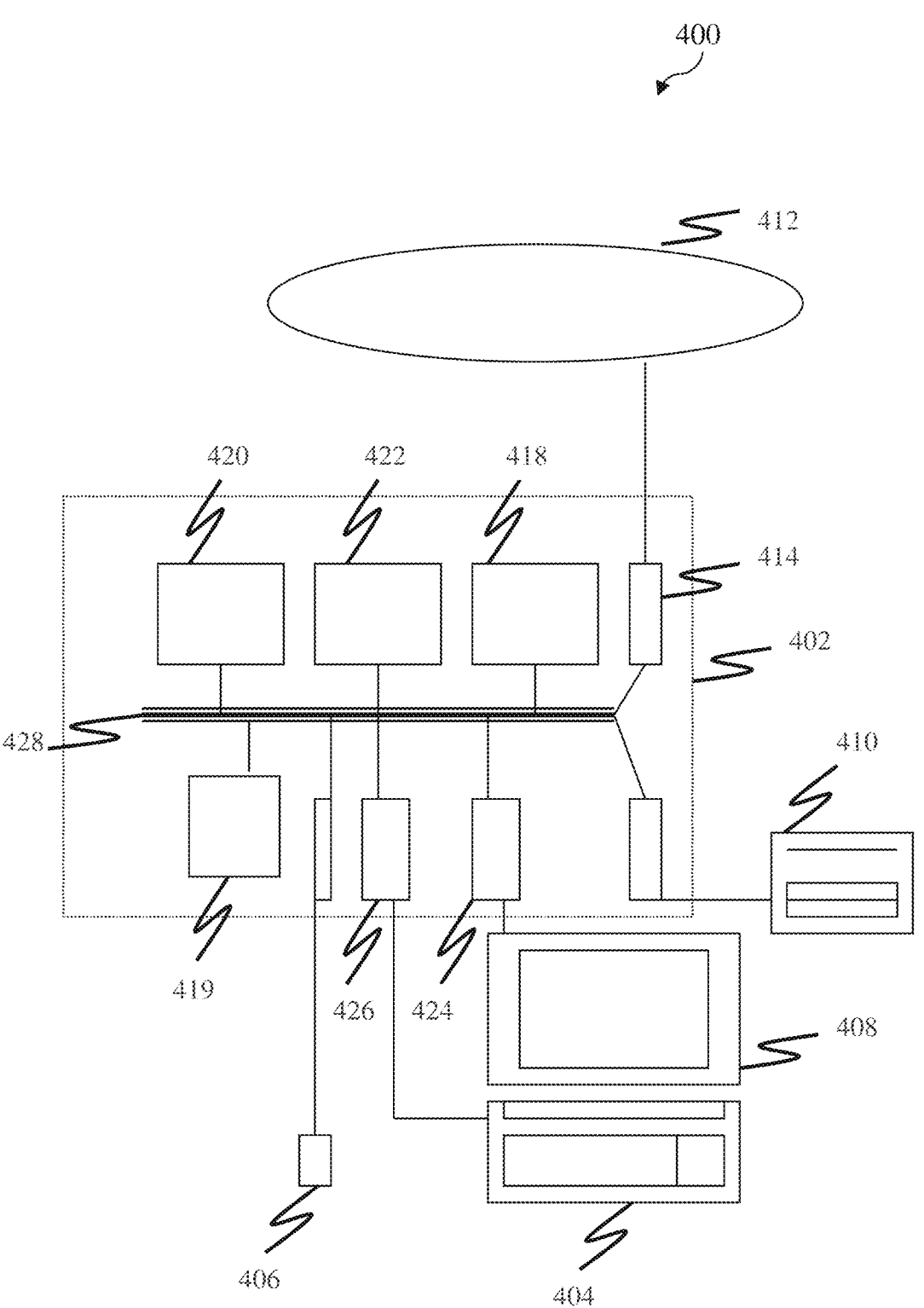
FIG. 4 depicts a schematic block diagram of an exemplary computer system in which a neural network processor system, according to various embodiments of the present invention, may be realized or implemented.

In various embodiments, the neural network processor system 100 may be realized by any computer system (e.g., portable or desktop computer system, such as tablet computers, laptop computers, mobile communications devices (e.g., smart phones), and so on) including at least the CPU(s) 120 and the NPUs 102 configured as described hereinbefore according to various embodiments, such as a computer system 400 as schematically shown in FIG. 4 as an example only and without limitation. Various methods/steps or functional modules may be implemented as software, such as a computer program (e.g., one or more neural network applications) being executed within the computer system 400, and instructing the computer system 400 (in particular, one or more processors therein) to conduct the methods/functions of various embodiments described herein. The computer system 400 may comprise a computer module 402, input modules, such as a keyboard 404 and a mouse 406, and a plurality of output devices such as a display 408, and a printer 410. The computer module 402 may be connected to a computer network 412 via a suitable transceiver device 414, to enable access to e.g., the Internet or other network systems such as Local Area Network (LAN) or Wide Area Network (WAN). The computer module 402 in the example may include a processor 418 (e.g., corresponding to the CPU(s) 120 of the neural network processor system 100 as described herein according to various embodiments) for executing various instructions (e.g., neural network application(s)), a neural network processor 419 (e.g., corresponding to the plurality of neural processing units 102 of the neural network processor system 100 as described herein according to various embodiments), a Random Access Memory (RAM) 420 and a Read Only Memory (ROM) 422. The neural network processor 419 may be coupled to the interconnected bus (system bus) 428 via one or more fabric bridges (not shown in FIG. 4). The computer module 402 may also include a number of Input/Output (I/O) interfaces, for example I/O interface 424 to the display 408, and I/O interface 426 to the keyboard 404. The components of the computer module 402 typically communicate via an interconnected bus 428 and in a manner known to the person skilled in the relevant art.

It will be appreciated to a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

In order that the present invention may be readily understood and put into practical effect, various example embodiments of the present invention will be described hereinafter by way of examples only and not limitations. It will be appreciated by a person skilled in the art that the present invention may, however, be embodied in various different forms or configurations and should not be construed as limited to the example embodiments set forth hereinafter. Rather, these example embodiments are provided so that this disclosure will be thorough and complete, and will fully convey the scope of the present invention to those skilled in the art.

Various example embodiments, in general, relate to the field of hardware accelerators, network-on-chip (NoC) and hardware implementation of artificial neural networks (ANNs). In various example embodiments, there is provided a neural network processor system (which may also be referred to as a neurocomputing machine or the like) comprising a plurality of low power block-based heterogeneous neural processing units (NPUs) which is suitable to run various types of neural networks on the same hardware platform alongside at least one CPU designed or configured to coordinate the operation of the machine as well as input/output (I/O) handling.

For example, while many neural network accelerators for recognition tasks have been conventionally disclosed, all of them are homogeneous, i.e., an array of identical neural processing cores. Furthermore, there does not appear to have been disclosed an effective method to communicate and transfer data back and forth between the central control (e.g., the CPU) and the neural processing cores (e.g., accelerator(s)).

To efficiently accelerate various computation tasks based on neural-network operations, various example embodiments provide multiple (e.g., several) heterogeneous block-based NPUs, each of which may be more suitable to run certain type(s) of neural networks. For example, one or more NPUs may be customized to run a traditional fully connected or convolution neural network operation while another one or more NPUs may be configured to run a spiking neural network. For example, depending on the work load, the CPU may be configured to assign the suitable neural tasks to the most efficient (or more suitable) NPU(s) (e.g., accelerator(s)). The number of NPUs may vary from system to system, depending on the target application.

For example, various example embodiments provide a low power heterogeneous block-based neurocomputing machine including one or more (e.g., several) central processing units (CPUs), a high performance and high bandwidth system bus, an array of system bus controller, and a plurality of neural processing units (NPUs). Each neurocomputing core can be further partitioned into an array of network weights, an array of neurons, a local memory for storing intermediate results, a local memory for storing the network connection, an array of activation function calculator and a local clock generator.

Various aspects of an example neural network processor system according to various example embodiments of the present invention will now be described below.

Example System Architecture

Figure 5:
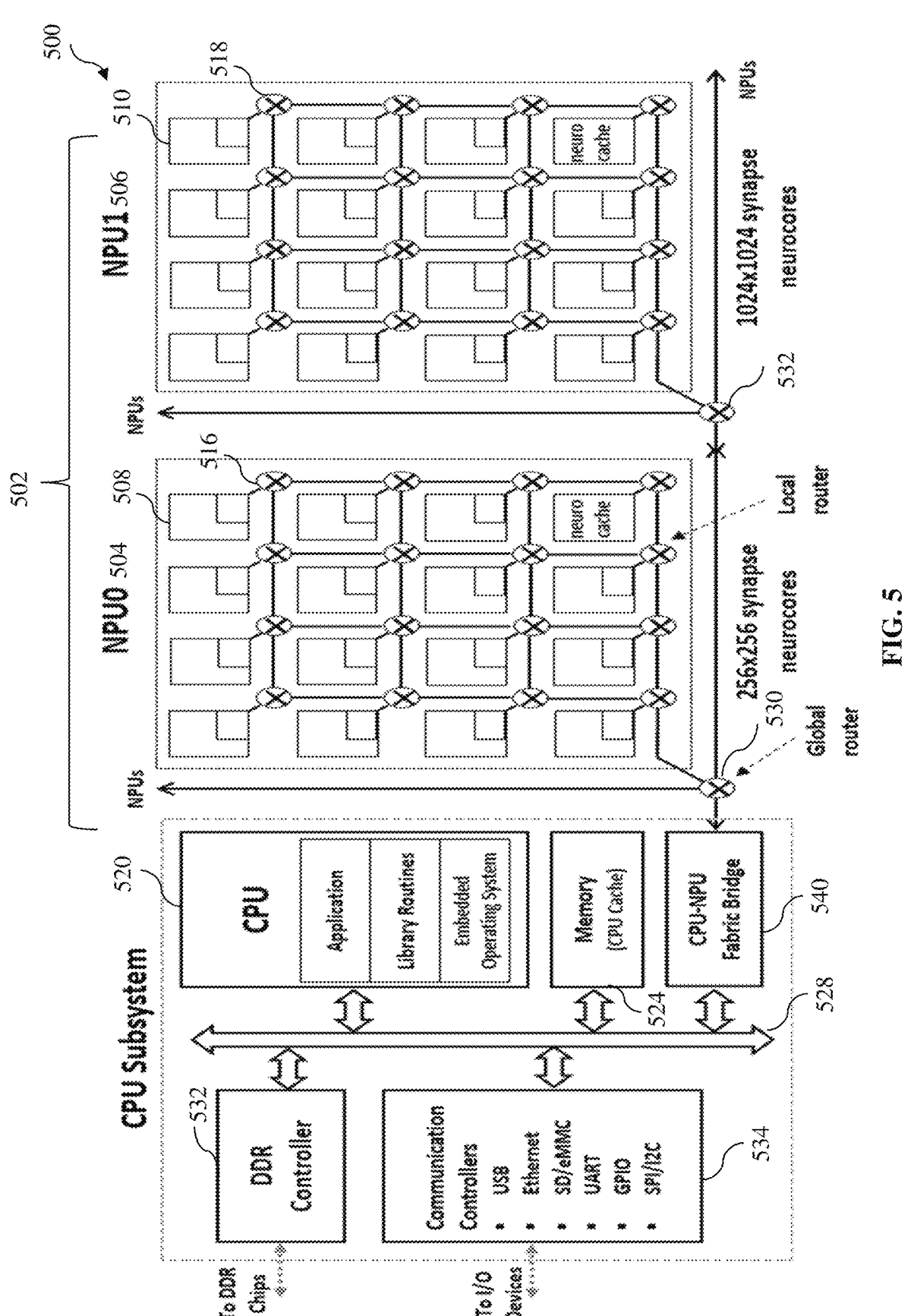
FIG. 5 depicts a schematic drawing of an example neural network processor system (e.g., neurocomputing machine), according to various example embodiments of the present invention.

FIG. 5 depicts a schematic drawing (example architecture) of an example neural network processor system (neurocomputing machine) 500 according to various example embodiments of the present invention, and more particularly, a heterogeneous block-based neurocomputing machine (e.g., a heterogeneous set of NPUs, each NPU comprising an array of neural processing core blocks). As shown in FIG. 5, the neurocomputing machine 500 may comprise at least one CPU 520, a CPU cache 524, at least one system bus 528, a DDR controller 532, various I/O communication controllers 534 (e.g., a USB controller, an Ethernet controller and so on), a plurality of NPUs 502 and at least one fabric bridge (CPU-NPU fabric bridge) 540. In the example neurocomputing machine 500 shown in FIG. 5, the CPU cache 524 is a memory block. In various example embodiments, the DDR controller 532 may be replaced with an on-chip system memory depending on various applications. Furthermore, each NPU core block (e.g., corresponding to the "neural processing core block" described herein, which may also be referred to as neurocore block) comprises at least one clock management unit and at least one individual power gating unit (e.g., see FIG. 7A).

The CPU(s) 520 is the central control of the neurocomputing machine 500 and, for example, offers the application developer the freedom to allocate available hardware resources to target multiple neurocomputing applications, all running concurrently. The CPU(s) 520 may be configured or tasked to synchronize and coordinate all the NPUs 502 to ensure a smooth operation for the target application. The CPU(s) 520 may also be responsible for communicating with the I/O peripheral via the shared system bus 528 using standard protocol such as AXI bus, as shown in FIG. 5.

In various example embodiments, the NPUs 502 may be specialized hardware for performing neural network computations. For example, the NPUs 502 may be configured or designed to maximize the parallelism in neural network computations for improving the overall system throughput. In various example embodiments, the NPUs 502 may be configured or designed to realize one-to-one mapping of the logical network topology, that is, each logical neuron in the network layer may be mapped to its respective physical hardware component. As a result, the network is advantageously able to run much faster as each neuron is able to function independently and simultaneously (i.e., in parallel). In contrast, in various conventional implementations, neurons may be modelled abstractly and thus must be processed sequentially. Accordingly, in various example embodiments, the NPUs 502 may be configured or designed to realize neuron-to-neuron (one-to-one) mapping to mimic logical neural network topologies, as required by the application developer.

In various example embodiments, the NPUs 502 may be configured to communicate with the CPU 520 via a fabric-router bridge 540 with the system bus 528. In various example embodiments, the CPU 520 may imprint or store scheduled tasks or neural events within a neurocache subsystem (e.g., corresponding to the neural cache block described herein according to various embodiments, which may also be referred to simply as a neurocache) in one or more NPUs 502, so that the NPUs 502 may receive or send these scheduled tasks or neural events from the respective neurocache instead of being from the CPU 520 to improve the system efficiency during operation. By way of an example only and without limitation, in an instance where the NPUs 502 run an image recognition task on an input streaming data from an image sensor, the CPU 520 may be assigned to actively perform preprocessing on the input streaming data, while the NPUs 502 may be processing the previous image frame. As another example, in another instance, the NPUs 502 may be scheduled to communicate to each other in a hierarchical manner. For example, one NPU may run a spiking neural network operation and send its computation results to another NPU which may run either a fully connected neural network or a convolution (or recurrent) neural network for further processing.

In various example embodiments, the NPUs 502 may communicate directly with each other or with the CPU 520 via the system bus 528, through a dedicated fabric bridge 540, as shown in FIG. 5. In various example embodiments, communication across different NPUs 502 may be configurable on the fly by setting appropriate destination look-up table within the neurocore in the respective NPU 502, which will be described in further detail later below.

Figure 6:
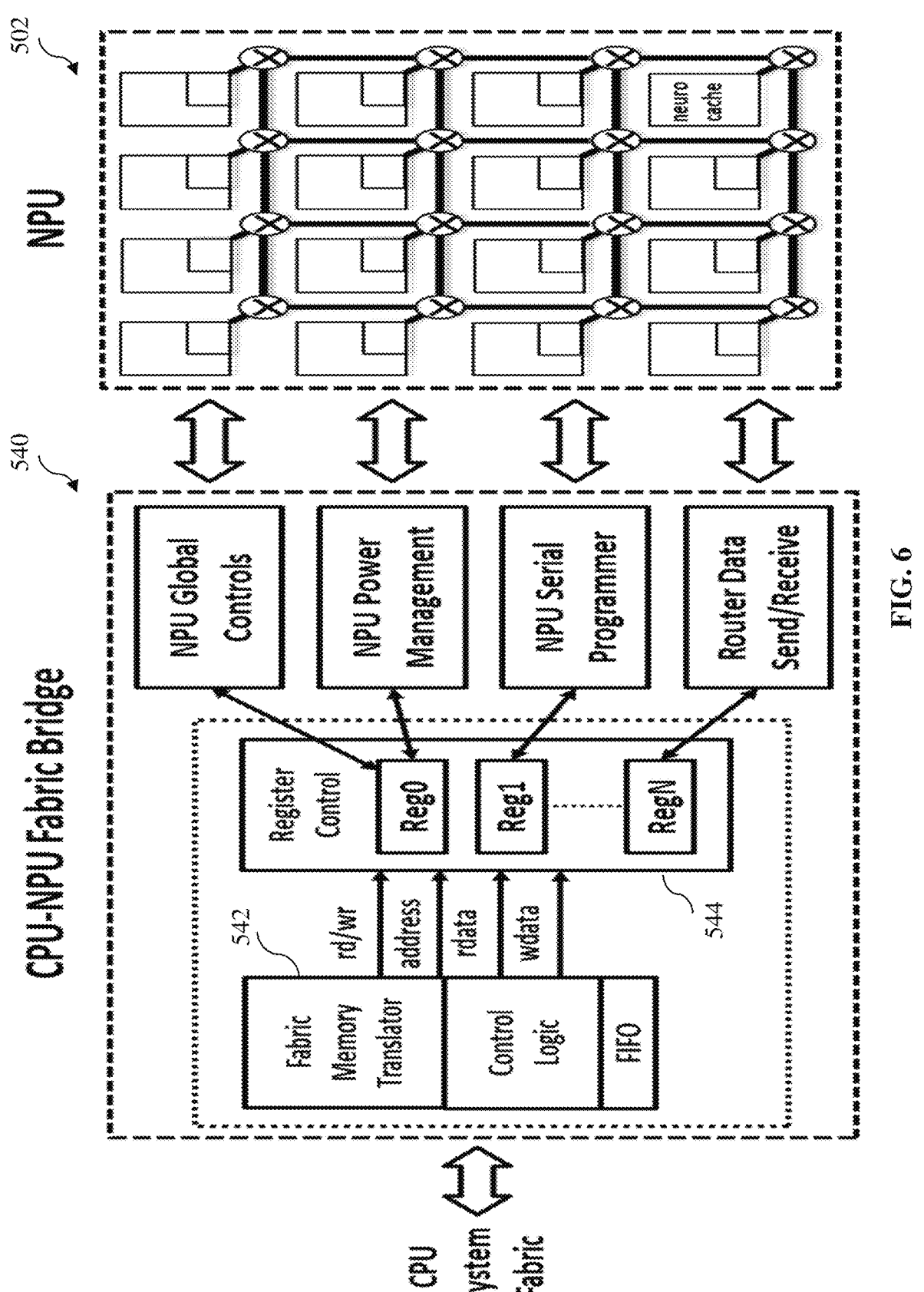
FIG. 6 depicts a schematic drawing of an example fabric bridge of the example neural network processor system shown in FIG. 5, according to various example embodiments of the present invention.

FIG. 6 depicts a schematic drawing (example architecture) of an example fabric bridge 540 of the example neurocomputing machine 500 shown in FIG. 5, according to various example embodiments of the present invention. According to various example embodiments, in order for the CPU 520 to send data to and receive computation results from the NPUs 502, a dedicated fabric bridge (CPU-NPU fabric bridge) 540 is provided. In this regard, the standard CPU and system bus may use a different data format when compared to the NPUs 502. For example, while the system bus 528 (i.e., the AXI bus) may use address-data format with 32-bit data bus width, the NPUs 502 may use AER (e.g., 32-bit) data format in case of spiking neural network, or a low-resolution (e.g., 8-bit) data format for a smaller neural network. In various example embodiments, the fabric bridge 540 may be configured to ensure that data will only be transferred from one side (e.g., the AXI bus) to the other (e.g., the NPU) when the receiver side (e.g., the NPU) is not busy so as to avoid data package loss. For example, if the receiver side is busy, the fabric bridge 540 may not transfer data and the data may be buffered inside a fabric bridge FIFO mechanism to cache the data and prevent data loss.

In various example embodiments, the fabric bridge 540 may comprise a fabric memory translator 542 configured to decode instructions received from the CPU 520 and convert the instructions into a simpler memory access protocol (e.g., the bus in between the fabric memory translator 542 and register control array module 544). This allows the CPU 520 to have access (e.g., read/write) into the register control array module 544. For example, the values in the register control array module may either directly control or correlates to all NPU functions, such as global control signals, power management signals, serial programmer, and router spike data input/output.

In various example embodiments, the system 500 may include multiple NPUs 502, each of the NPUs (e.g., a first NPU (NPU0) 504 and a second NPU (NPU1) 506) may have a different structural configuration (e.g., different size and/or internal structures, such as the number of neurocore blocks 508, 510 (unit size) and/or the size of each neurocore (core size) in the respective NPU). The NPUs 502 may be configured to communicate in various ways. In various example embodiments, as shown in FIG. 1, two or more NPUs 502 may be cascaded in series to perform hierarchical neural computations. In various other example embodiments, each NPU 502 may operate independently and only communicate with the CPU(s) 520 via its respective fabric bridge 540.

Example NPU Subsystem

Figure 7A:
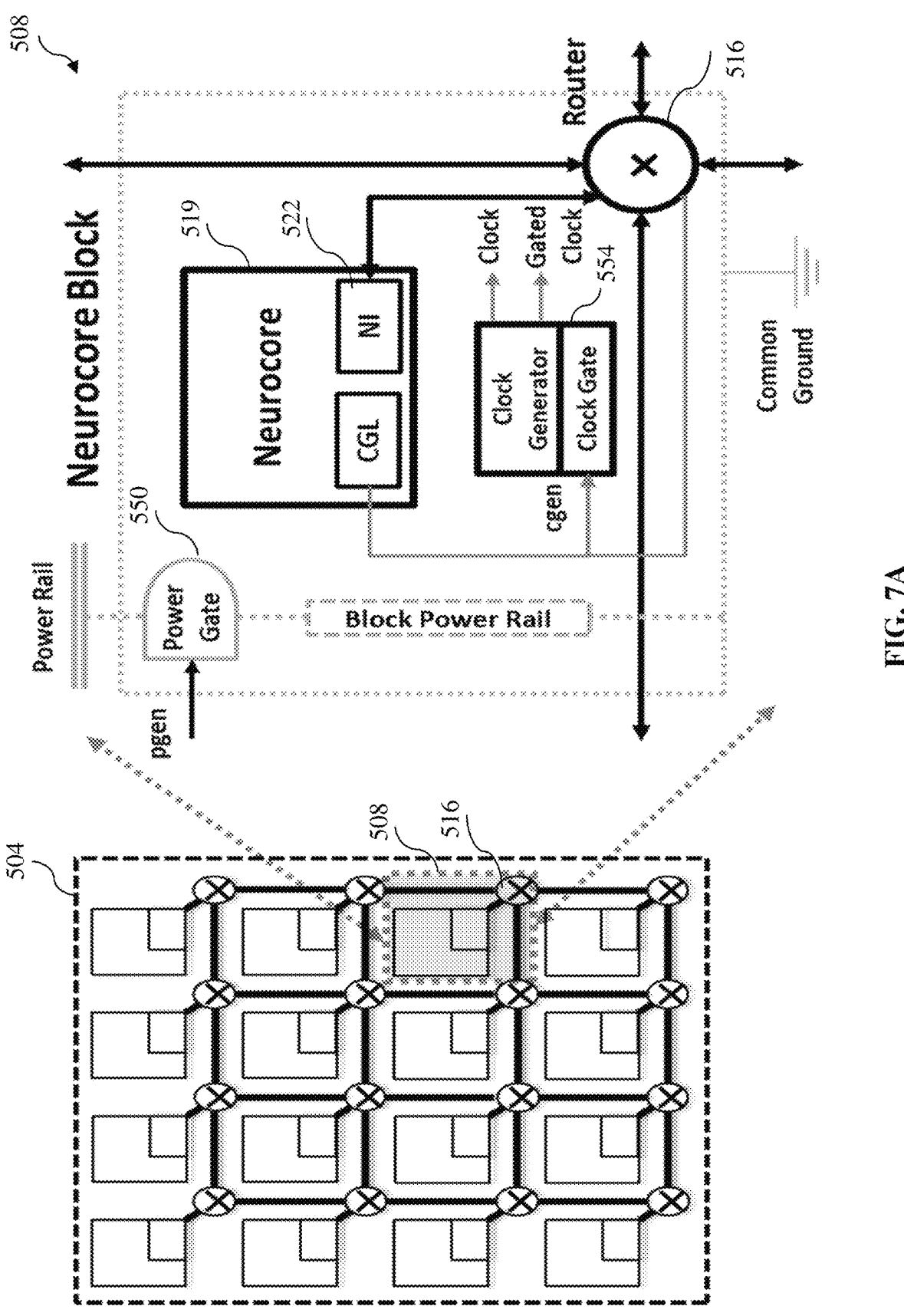
FIG. 7A depicts a schematic drawing of a neural processing unit (NPU) of the example neural network processor system shown in FIG. 5, along with an enlarged view of a neurocore block of the NPU, according to various example embodiments of the present invention.

In the example neurocomputing machine 500 as shown in FIG. 5, each NPU 502 may include an array of identical neurocore blocks 508, 510 interconnected via an array of network routers (e.g., which may be referred to herein as local routers) 516, 518 forming a mesh grid (e.g., see FIG. 7A). For example, this resembles a topology that forms an on-chip network, i.e., Network-on-Chip (NoC). FIG. 7A depicts a schematic drawing (example architecture) of an NPU 504 of the example neurocomputing machine 500, along with an enlarged view of a neurocore block 508. As shown in FIG. 7A, each neurocore 519 may be connected to a corresponding network router (e.g., a corresponding local router) 516 via a network interface 522.

Figure 7B:
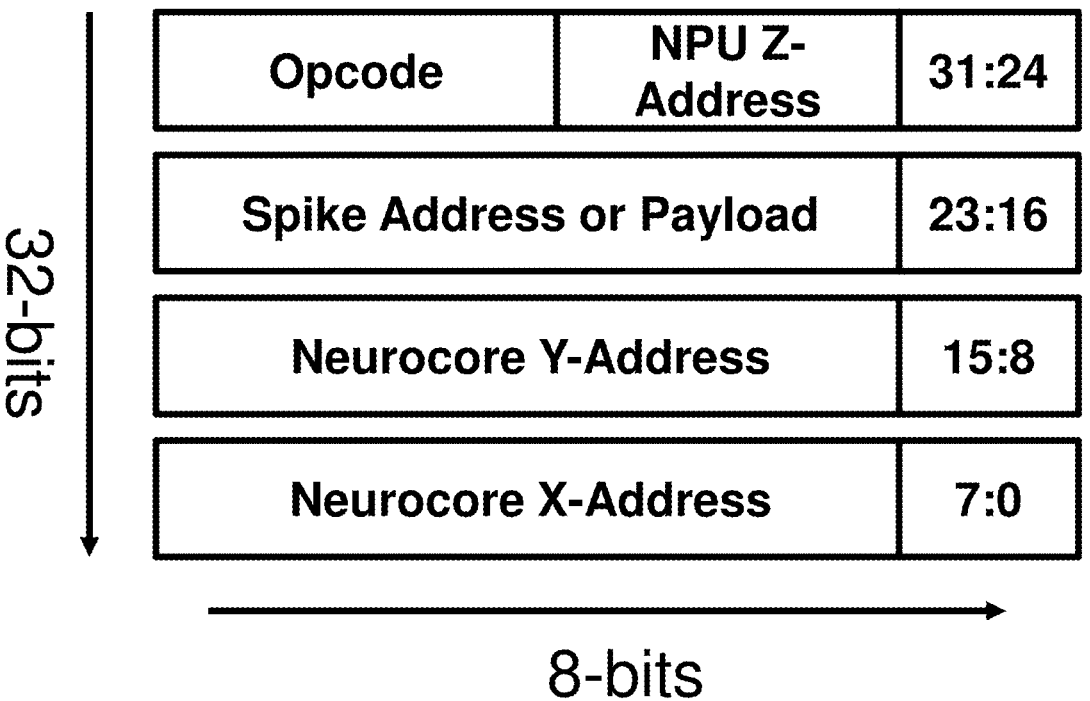
FIG. 7B depicts an exemplary data format of a neural data packet, according to various example embodiments of the present invention.

In various example embodiments, each router 516 and neurocore 519 (or neurocore block 508) has its own (X,Y,Z) location address, which may be encoded in a neural data packet. By way of an example only and without limitation, FIG. 7B illustrates an exemplary data format of a neural data packet (e.g., 32 bits×8 bits). The X and Y coordinates may denote a two-dimensional localized address (or position) of the neurocore 519 within the corresponding NPU 502 and the Z coordinate may denote an address (or position) of the NPU 502 itself. For example, the X and Y coordinates may directly translate into row and column of the neurocore 519 within the corresponding NPU 502, and the Z coordinate may be a single coordinate, or optionally, the Z coordinate may have up to two dimensions, namely $Z_x$ and $Z_y$. For example, the neurocore at top right corner of the first NPU 504 may have an address (3,3,0) while the neurocore at the top right corner of the second NPU 506 may have an address (3,3,1). In addition, as shown in FIG. 5, each NPU 502 may have a respective global router R0 530, R1 532 associated thereto. Accordingly, any neural data packet that needs to be sent across the NPUs 502 (i.e., from one NPU to another or to the CPU) must be sent via the associated global router. This in turn decodes the Z address and determines the final destination of the neural data packet and route the neural data packet accordingly. This offers a seamless mechanism in which data packets can be routed across the NPUs 502. For example, if a local router (which may also be referred to as an internal router) decoded that the data packet is to be sent to another NPU, the local router may route the data packet to the associated global router of the other NPU.

For illustration purpose and by way of an example only, referring to FIG. 5, a neural data packet may be sent from a neurocore at, for example, location (3,3,0) in NPU0 504 to, for example, location (2,3,1) in NPU1 506 in the following manner. Within NPU0 504, the data packet is sent from the neurocore to its corresponding router. The router decodes that the destination is in another NPU (i.e., NPU1) and thus the router routes the data packet to the global router R0 530 associated with the NPU0 504. In order to do so, for example, the data packet may be sent south to router at (3,2,0). Subsequently, router at (3,2,0) sends the data packet to router (3,1,0) until the data packet reaches the lowest row, i.e., router (3,0,0). This router may then send the data packet westwards. After another 4 hops, the data packet reaches the global router R0 530 associated with the NPU0 504. The global router R0 530 may then determine that the data packet should be transmitted eastward to enter global router R1 532 of NPU1 506. The global router R1 532 may determine that the NPU1 506 is the destination NPU and thus the global router R1 532 of NPU1 506 may then forward the data packet to router (1,1,1) in NPU1 506. Within the NPU1 506, the data packet may then be routed to neurocore at (2,3,1), following any suitable routing algorithm or the routing technique as described above with respect to NPU0 504.

For example, the global routers R0 530, R1 532 and their links may function as highways which connects different NPUs together. Furthermore, as each global router R0 530, R1 532 may act as a highway, according to various example embodiments, the global router R0 530, R1 532 may each have the capacity to handle a much higher bandwidth when compared to the local routers 516, 518 within the NPUs.

In various example embodiments, each neurocore block 508 has its own power gating structure 550 as well as a clock generator block 554 for supporting self power and clock gating operations, respectively. In various example embodiments, the neurocore 519 is powered off if it is not activated as a part of the network while the clock is disable if there is no input spike coming to the core. This enables the system 500 to consume as little power as possible.

Neurocore

Figure 8:
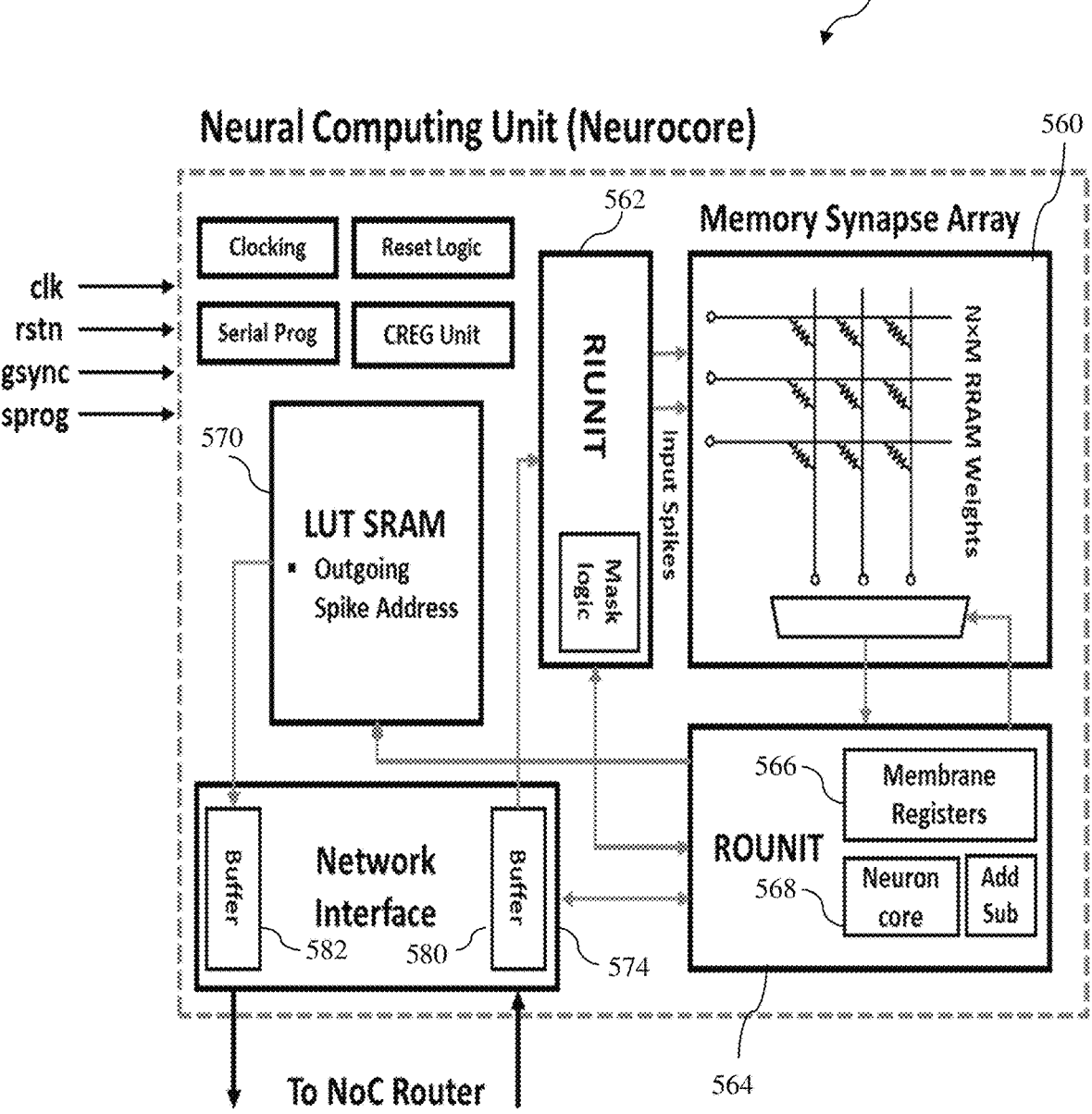
FIG. 8 depicts a schematic drawing of a neural processing core (neurocore) of a neural processing unit shown in FIG. 5, according to various example embodiments of the present invention.

Neurocores 519 are essentially the computation units of the whole network. FIG. 8 depicts a schematic drawing (example architecture) of a neurocore 519 of a neural processing unit shown in FIG. 5, according to various example embodiments of the present invention. As shown, each neurocore 519 comprises at least one memory synapse array 560 which is capable of performing in-memory matrix computational tasks, an input scheduling unit (RIUNIT) 562, an output scheduling unit (ROUNIT) 564, a memory register (e.g., memory array) 566 configured to store intermediate matrix computation outputs, at least one look-up table (LUT) 570 configured to store the destination of the forwarded packages, a network interface 574. In various example embodiments, all neurocores 519 are simultaneously capable of handling the transmission, reception and processing of spikes. For example, the spikes enter through the network interface 574, and into the RIUNIT 562. The memory synapse array 560 computes the results in conjunction with the ROUNIT 564, and produce output spikes if predetermined neuron conditions are met. The neuron computing unit 568 is implemented within the ROUNIT 564, and may be configured specifically to handle spike input accumulation, membrane potential storage/reset/leakage, and output spike handling. For example, neurocore configuration may be performed via serial programming for uploading SNN weights, LUT (topology), and control register (CREG) values. The SNN layer topology may be programmed into the LUT SRAM 570 depending on various applications. Timing windows between frames as well as synchronization between neurocores may be handled via a global synchronization signal (gsync), and soft/hard reset signals.

In various example embodiments, the neurocore 519 may be configured to include three modes of operation, namely, a disabled mode, a standby mode and an active mode.

In the disabled mode, the neurocore 519 may be turned off completely by the network configuration process and thus do not contribute to the network operation at all. This may be set by the CPU 520 and does not change until a new network is implemented on the NPU. In the disabled mode, the power source to the neuro core is shut down via the power gate 550 to save both dynamic and leakage power. For example, this disabled mode may be especially advantageous in Internet of Things (IoT) or edge computing applications where leakage power is the main source of power consumption due to long inactive time.

In the standby mode, the neurocore 519 does not perform any activity even though that they may be part of an active network. For example, this situation may arise when the neurons in a layer do not receive any spike or activity from the neurons in the previous layer and thus do not need to process any information. This may be particularly true in spiking neural networks where weighted inputs to a neuron are processed (i.e., integrated) only when the pre-synaptic neurons fire spikes. Note that in large spiking neural networks, most of the neurons and cores in deeper layers are in standby mode most of the time and are only activated once in a while. In this standby mode, the neurocore 519 may still be powered so that it can be activated quickly. However, no activity happens and thus its clock signal is gated according to various example embodiments to save dynamic switching power.

In the active mode, the neurocore 519 may receive input signals from pre-synaptic neurons (e.g., spikes) which are sent to it buffered inside the network interface 574. For example, each valid input in the buffers indicates the address of the row (axon) of the memory synapse array 560. The RIUNIT 562 reads the input buffer 580 inside the network interface 574 and sequentially set the masking latch of the corresponding row to "1". Once the input buffer 580 is cleared, an enable signal may be issued to concurrently turn on all the wordlines (WLs) which have masking latch value of "1". Each selected cell in the memory synapse array 560 may sink a current proportional to the cell's conductance which are summed along the bitlines (BLs). Each neuron per BL may then integrate this summed current and raise its membrane potential accordingly. The integration process may be performed in either the digital or analog domain.

In various example embodiments, once the membrane potential of a neuron exceeds a pre-defined threshold, a spike may be generated and sent to its corresponding destination, which can either be a neurocore within the same NPU or a neurocore in another NPU. For example, address of the destination core and axon may be stored in a look-up table 570, as shown in FIG. 8. For example, if the k$^{th}$ column's neuron fires, content of the k$^{th}$ row (i.e., k$^{th}$ wordline) will be read out and sent to the output buffer 582 inside the network interface (NI) 574. In other words, if the k$^{th}$ column's neuron fires, the network interface 574 will be triggered to send a spike. This spike contains the content (e.g., value) taken from the k$^{th}$ row of the LUT STRAM 570 that was pre-programmed by the application developer. Once a spike is placed in the output buffer 582, the neuron's membrane potential may then be reset to a pre-defined value. Subsequently, the network interface 574 may then push the data package to the corresponding router so that it can be forwarded to its destination. For a convolution neural network (CNN), the CNN may be algorithmically remapped into a spiking neural network (SNN), which can then utilize the hardware architecture shown in FIG. 8. In other words, the hardware architecture is also compatible with other types of networks after appropriate algorithmic conversion.

Neurocache

Figure 9:
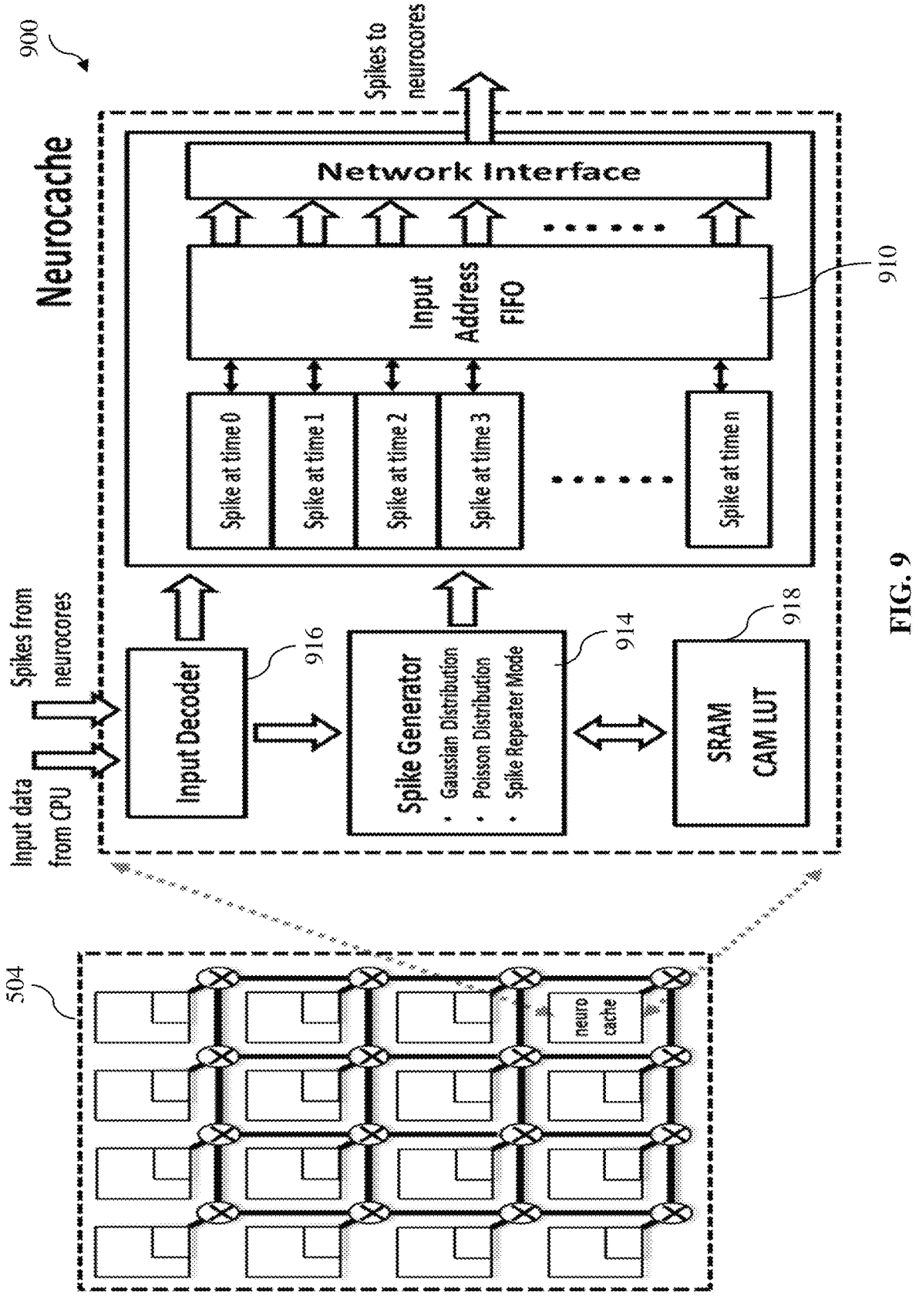
FIG. 9 depicts a schematic drawing of a neural cache block (neurocache) of a neural processing unit shown in FIG. 5, according to various example embodiments of the present invention.

FIG. 9 depicts a schematic drawing (example architecture) of a neural cache block (neurocache) 900 according to various example embodiments of the present invention. The neurocache 900 may be configured to handle spike data buffering, repeating, and generation within one NPU. The neurocache 900 is placed within the NPU, and the memory buffer 910 may be determined based on a precalculated neurocore to neurocache ratio. The neurocache 900 may be a flexible memory unit configured to be able to buffer spikes on a time ordered manner. In various example embodiments, the neurocache 900 comprises a spike generator 914 configured to perform spike generation by taking in raw input data and converting it into time-based ordered spikes, which may then be stored within the memory buffer (e.g., FIFOs) 910. In various example embodiments, raw input data may be semi-processed data (or partially processed data) from the CPU 520 (e.g., cropped image, filtered sounds, and so on) that is further processed/separated into even smaller units/components (e.g., pixel portions, frequency domains, and so on). For example, the raw input data is raw in the sense that it is not in router spike data format, but still resembles its original form (i.e., post-processed) and is to be converted into time-based spikes (i.e., spike generation). The neurocache 900 may also be configured to be able to repeat spikes received from other neurocore(s). This offloads the CPU from performing these time-based spike transactions and conversions during operation, which can significantly reduce power consumption.

As shown in FIG. 9, the neurocache 900 may further comprise an input decoding block 916 configured to decipher the input to determine if it is a raw data from the CPU 520 or a spike from other neurocore(s). For example, the raw data from the CPU 520 may be converted by the spike generator 914 into time-based spikes via a distribution function (e.g., Poisson of Gaussian) and stored in the FIFOs 910 of the neurocache 900 for subsequent sending during operation mode. In various example embodiments, the CPU 520 may bypass the hardware spike generator 914 and directly store time-based spikes within the FIFOs 910 of the neurocache 900.

On the other hand, spikes from other neurocores as input may trigger the spike generator 914 to operate in a spike repeater or function to repeat the spikes based on the content addressable memory (CAM) lookup table (LUT) 918. For example, the CAM LUT 918 may store pre-programed spike trains, each of which may trigger when it receives a particular or corresponding input spike. It may be a look up table (LUT) of these spike trains, and the spike input defines which portion of the lookup table to use. The spike generator 914 may be the primary controller unit for this function, whereas the CAM LUT 918 may only function as a memory unit. This behaviour (and whether it needs to be used) is dependent on the application developer, as different neural network topologies may not necessarily require it. The spike generator 914 and the CAM LUT 918 thus allows the neurocores to broadcast a single spike to other designated neurocores via a large number of repeated spikes in a centralized and programmable manner. This function offloads this task from the neurocores itself, allowing them to have a more regular hardware structure, as not all of them are required to perform spike broadcasts all the time. In various example embodiments, the neurocache CAM LUT 918 is preprogrammed by the CPU 520 prior to operation.

In-Memory Computation Matrix (Memory Synapse Array)

Figure 10:
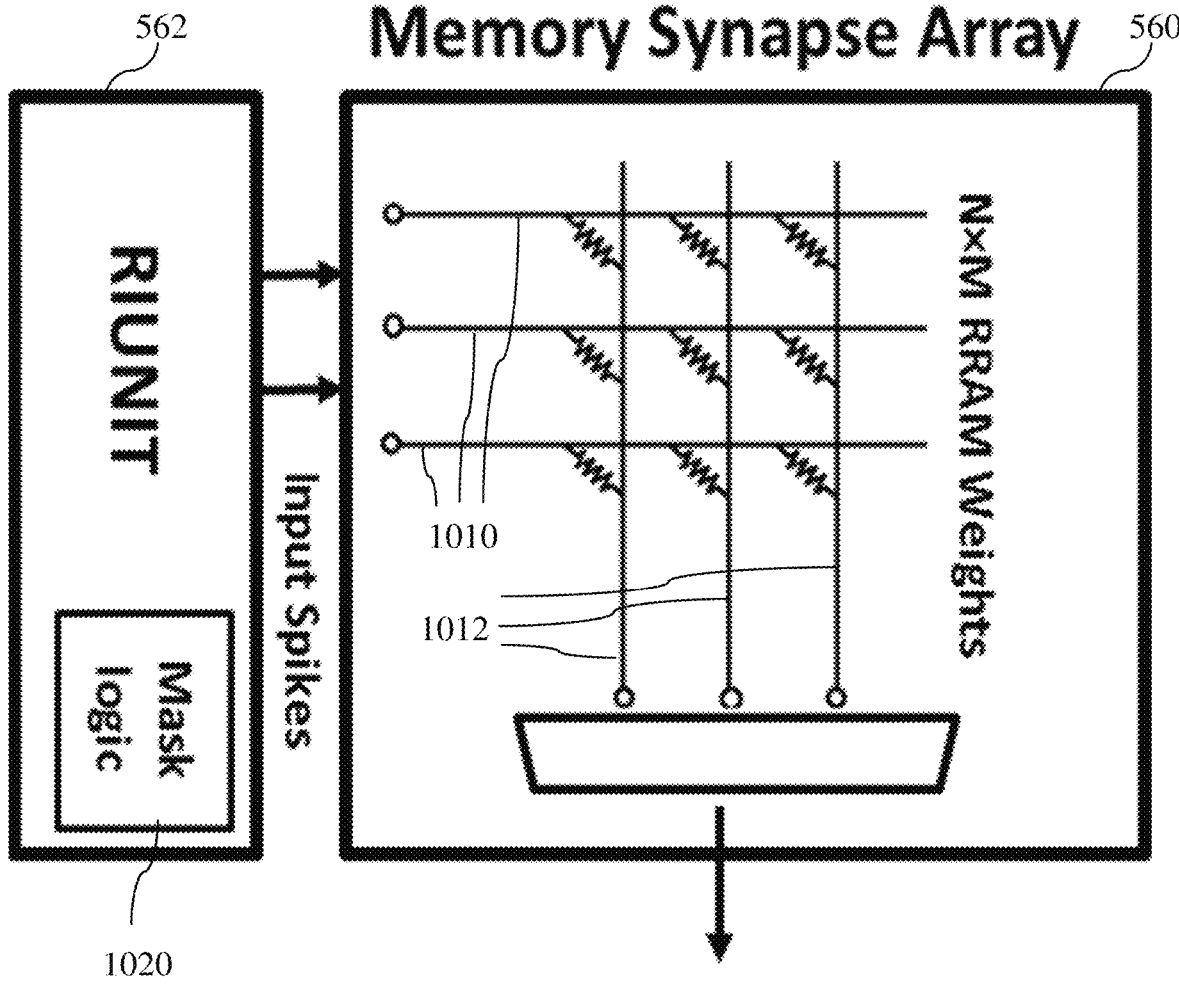
FIG. 10 depicts a schematic drawing of the memory synapse array of the neural processing core shown in FIG. 8, according to various example embodiments of the present invention.

FIG. 10 shows an enlarged version of the memory synapse array 560 (which may be simply referred to herein as "memory array") of the neurocore 519 shown in FIG. 8. In various example embodiments, the memory array 560 may be implemented using conventional SRAM or non-volatile memory technology such as RRAM or MRAM. The memory array 560, including the memory cells therein, is configured such that the memory array 560 can receive parallel input signals from the word lines (WLs) 1010, perform local computation within the memory cell and transfer the partial sum to the bit lines (BLs) 1012, which can be summed by the local BL circuit. In various example embodiments, the memory array 560 is configured to allow multiple rows to be turned on at the same time for performing parallel in-memory computation operation.

For example, an SRAM-based implementation may be used to form a binary cross-bar array or multi-bit cross-bar array. In another example, an RRAM implementation (e.g., as shown in FIG. 10) may be used to form an analog cross-bar array where the conductance of each RRAM cell represents the weight connecting the WLs and the BLs. Depending on the particular implementation, the memory array 560 may be configured to perform different type of matrix multiplication.

In various example embodiments, a conventional row decoder may be combined with a latch array with one latch per row to form a mask logic 1020 in the RIUNT unit 562 as shown in FIG. 10. Before any spike processing window, the latch array may reset to zero. As the input spikes are processed sequentially, the corresponding row of the memory array 560 may be activated by the row decoder. However, its output may not be sent directly to the WL 1010 as in a typical memory array. Instead, the row decoder may set the corresponding latch value to one. As a result, all selected rows may be registered by the latch array. At the end of this process, an enable signal may be used to activate all selected row at the same time. As a result, all selected cells in the same column may conduct currents concurrently and the sum of their individual current can be measured along the bit line 1012.

By properly scheduling the sequence of the input signals using the input scheduling unit 562 and output scheduling unit 564, matrix computation can be efficiently performed using the above-mentioned memory array 560. The specific size of the memory array 560 may depend on various factors, such as the range of target matrix computation, therefore, it will be appreciated by a person skilled in the art that memory array 560 is not limited to any specific size(s). For example, to implement fully connected layers, the number of rows and columns of the memory array may be the same as the number of neurons in the input layers and output layers, respectively. On the other hand, to implement the convolution layers, the number of rows may be the same as the size of the filter map (e.g., 3×3=9) while number of columns may be the same as the number of filter channels.

In various example embodiments, a neuron (artificial neuron) per column may be used to integrate the summed current along the column and evaluate the total neuron potential. Once the neuron potential exceeds a predefined threshold, the neuron may be configured to generate a spike, which may then be sent to suitable neurons in the next layer of the network.

In various example embodiments, a neuron may be implemented in either digital or analog manner. The neuron itself may exhibit different dynamics, depending on the requirement of the neural network algorithm. For example, the neuron may only perform integrate and fire operation. In another example, the neuron may perform leaky integrate and fire operation. More complex neuron dynamics may also be possible but they may lead to higher power consumption and larger silicon area.

In various example embodiments, the neurons receive the total sum from each bit line and perform an activation function, depending on the respective neuron model. For example, in a spiking neural network, the neurons may operate based on a simple Leaky Integrate-and-Fire (LIF) neuron model while in a traditional neural network, the neurons may operate based on a sigmoid or Rectified Linear Unit (ReLU) neuron model. The neuron activation may be implemented in either analog or digital manner with different level of computation accuracy. In various example embodiments, computation simplifications may be implemented to offer area and power efficiency with minimal drop in network calculation accuracy.

In various example embodiments, outputs of the neurons may be sent to another neurocore for further processing based on the content of the look-up table (LUT) 570. The look-up table 570 may be programmable to provide flexibility in terms of network topology implementation. For example, in a digital implementation, leaky behavior may be implemented by subtraction or division by $2^n$(programmable), while in an analog implementation, leaky behavior may be implemented by conducting current to ground. The leaky behavior may be based on the current profile. Various example embodiments note that in an extreme case where the leak current is zero, the neuron behaves the same as integrate and fire neuron.

In a neural network implementation, a low threshold may lead to a higher firing rate of the neurons and thus an unstable network. On the other hand, a high threshold may require a lot of input spikes for a particular neuron to fire and thus an inactive neuron. There is however no general optimum threshold value and in practice a suitable or effective value may change from one application to another application, from one NPU to another NPU and from core to core. While it is possible to even implement one threshold per neuron, it may not be hardware and software friendly. Thus, various example embodiments may implement one threshold per neurocore 519. This allows effective adjustment of the threshold for optimum network performance without losing too much overhead.

In a digital implementation, a neuron threshold may be stored in either SRAM cells or DFF which may be programmed prior to any operation. In an analog implementation, a neuron threshold may be stored via a reference voltage generator. Various example embodiments note that a stable, temperature-independent voltage generator may not be required. Instead, according to various example embodiments, a simple, low-power reference voltage such as a DAC is sufficient.

Router Design

Figure 11:
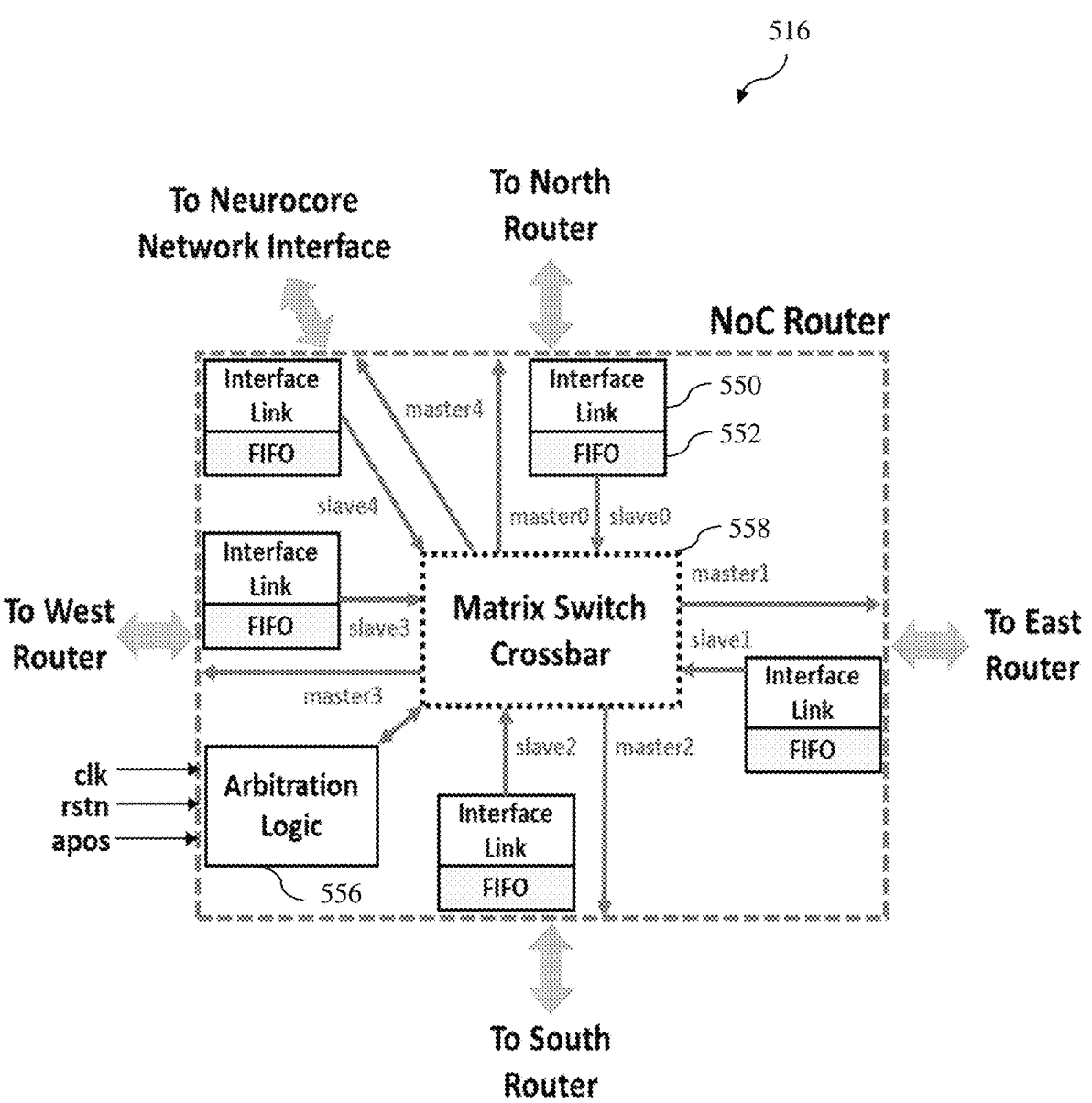
FIG. 11 depicts a schematic drawing of a router of a neural processing unit shown in FIG. 5, according to various example embodiments of the present invention.

FIG. 11 depicts a schematic drawing (example architecture) showing a router 516 of a neural processing unit shown in FIG. 5, according to various example embodiments of the present invention. As shown in FIG. 11, each router 516 may comprise N ports, whereby N–1 ports may be used to connect to the other routers (e.g., neighboring routers) to form the router network while the $N^{th}$ port may be communicatively coupled (connected) to the associated neurocore 519 via the network interface 574 of the neurocore 519. For example, for the example neurocomputing machine 500 shown in FIG. 5, 5-port routers 516 may be used to form a vanilla 2D mesh network where each router connects to the other 4 routers via 4 ports (East, West, North, South) while the $5^{th}$ port is connected to the network interface 574 of the neurocore 519. In various example embodiments, the routers 516 communicate with each other and the network interface 574 of the neurocore 519 using an asynchronous interface protocol. In various example embodiments, within each router 516 and each neurocore 519, the whole design may still be synchronous for easier implementation of hardware algorithms in the logic domain, that is, locally synchronous with asynchronous interfaces.

In various example embodiments, the interface links 550 may be configured to store the incoming neural data packets in the associated FIFO 552, and send a notification to the arbitration logic module 556. The arbitration logic module 556 may be configured to inspect this incoming neural data packet, and determine which direction the neural data packet should be routed in conjunction with requests from all other interface links. The arbitration logic module 556 may then configure the routing logic of the matrix switch crossbar 558 to facilitate the transmission of the neural data packet to the next router.

Timing Protocol

Figure 12:
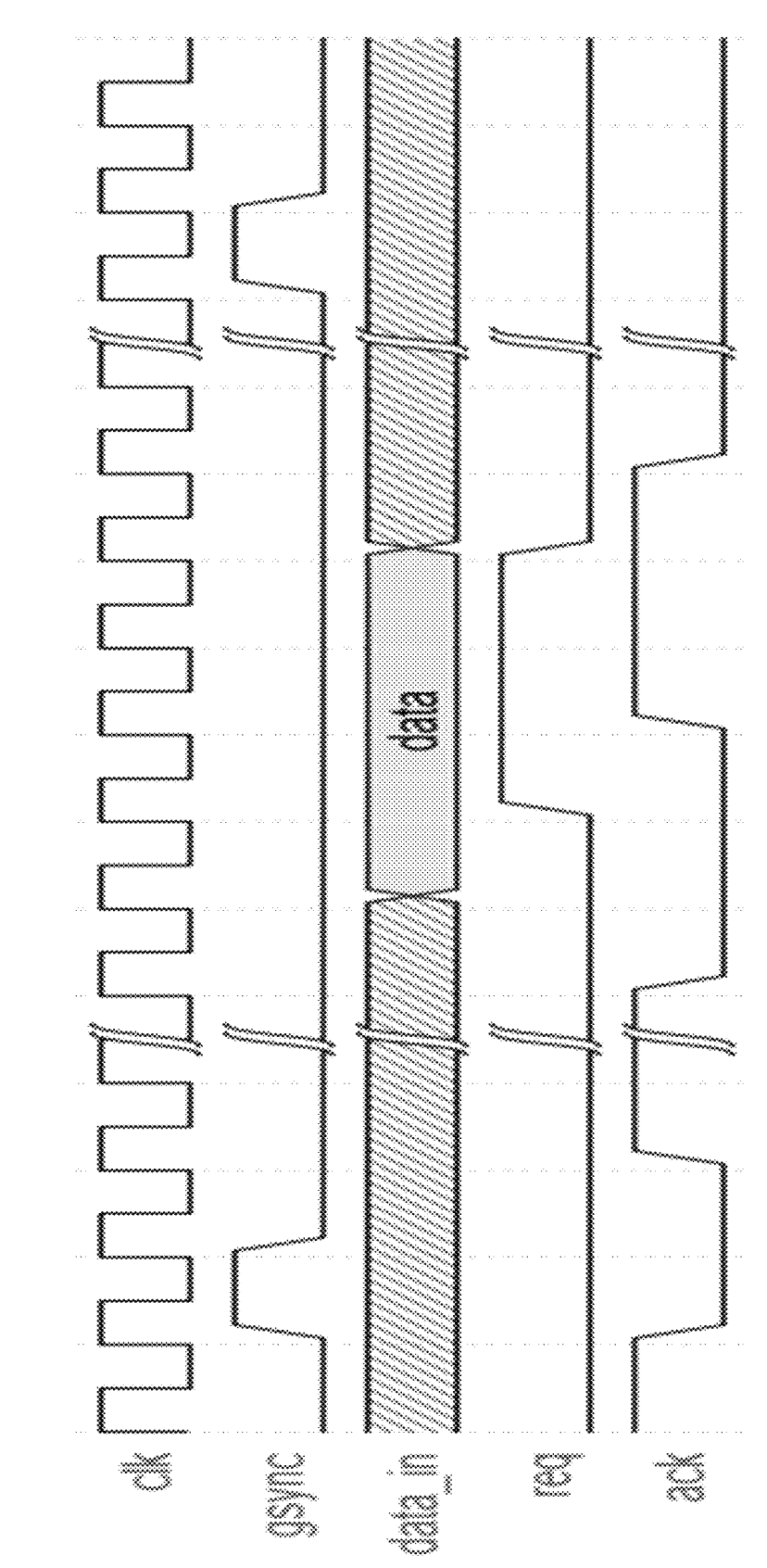
FIG. 12 depicts an exemplary communication timing protocol relating to the neural processing core and the router shown in FIG. 7A, according to various example embodiments of the present invention.

In various example embodiments, the routers 516 and the neuron cores 519 may communicate with their neighbor using an exemplary timing protocol 1200 shown in FIG. 12. The gsync signal denotes the global synchronous signal which only impacts the neuron core for the purpose of frame synchronization. The clock signal (clk) shown in FIG. 12 denotes a local clock, and is not global. When data is available at the transmitter end of a port (e.g., output of the East side of the transmitting router), the transmitting router may assert the request signal (req) to signify that new data is available. On the receiving side, data may be latched and subsequently an acknowledge signal (ack) is sent back to the transmitter. Finally, data is removed from the bus and both req and ack signals are de-asserted accordingly. This exemplary timing protocol facilitates all building blocks to communicate using their own internal clock and thus there is no strict requirement for synchronization across the SoC.

Clock Distribution Scheme

In a modern VLSI system, power distributed by the clock system may contribute up to 30% of the whole system. Furthermore, clock tree synthesis and clock skew optimization may be a challenge for extremely large systems. To better utilize the event-driven nature of neuromorphic system, various example embodiments adopt a locally synchronous, globally asynchronous approach. Towards that scheme, according to various example embodiments, each building block of the design is supplied with its own local clock generator with self-wake-up control. Thus, whenever the block is in a standby mode, its clock signal can be automatically turned off to save power. Since the whole SoC is globally asynchronous, there is no strict requirement regarding individual clock frequency and phase. Accordingly, for example, each router 516 and each neuron core 519 have their own clock generator. In various example embodiments, it is also possible to combine both units into a single block, and then share a single clock generator unit to save area. The granularity of the scheme depends on the design requirements.

Figure 13:
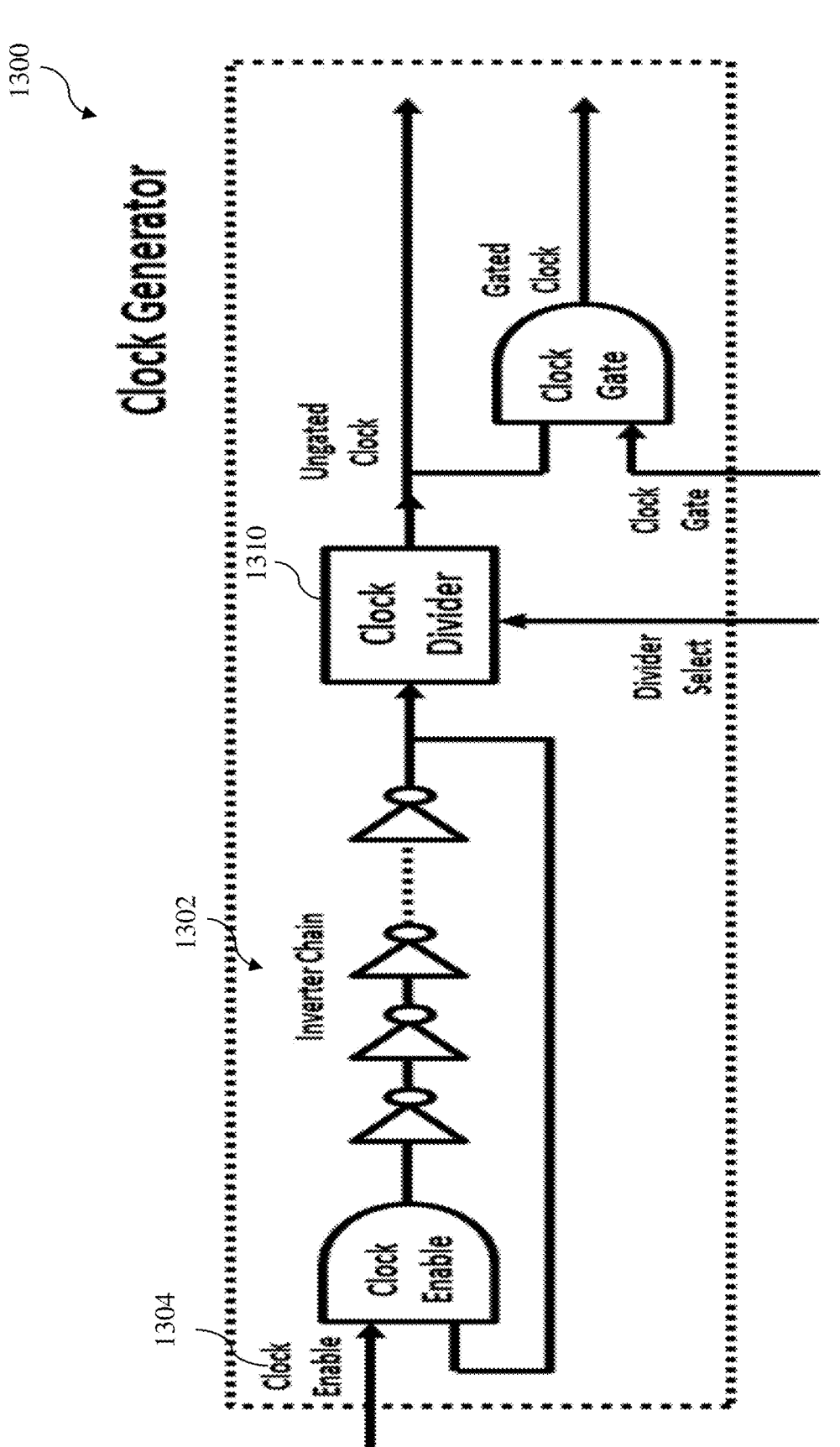
FIG. 13 depicts a schematic drawing of an example clock generator of the neural processing core block shown in FIG. 7A, based on a ring oscillator, according to various example embodiments of the present invention.

FIG. 13 depicts a schematic drawing (example architecture) of an example clock generator 1300 based on a ring oscillator 1302 according to various example embodiments. The clock enable signal 1304 is generated automatically by the core/router if they are out of the standby mode. Furthermore, the clock can also be either power gated (i.e., totally off, including the ring oscillator 1302) or clock gated (i.e., the ring oscillator is still active) if necessary. This allows the system to have more flexible control over the clock gating scheme. In addition, to provide near 50% duty cycle clock signal, a clock divider 1310 may be added at the output node of the ring oscillator 1302. The clock divider 1310 may also be used to further reduce the clock frequency, if necessary. This provides an additional level of configurability of the design.

Accordingly, in various example embodiments, the local clock generator 1300 may be implemented by means of ring oscillator, with power gating capability. During active, the ring oscillator 1302 is activated to provide clock signal to the core. During standby, the ring oscillator 1302 should be power gated to save power. Due to the asynchronous interfaces between the network interface and the routers, it is not required for all the clock generators 1300 from different neurocores 519 to have the same frequency. It also relaxes the design requirement of the clock generator 1300 and thus minimizes power consumption.

CPU Subsystem Architecture

Referring back to FIG. 5, the CPU subsystem 520 may comprise at least one general purpose processor 520, a CPU cache 524, at least one system bus 528, various I/O communication controllers 532, 534, and various memory blocks (e.g., on-chip system memory). With these components, the CPU subsystem 520 may be able to boot and execute an operating system such as embedded Linux. Being able to run an operating system on-chip will allow the target application to make full use of various software stacks, such as the filesystem, networking stacks, as well as various processing libraries.

Figure 14:
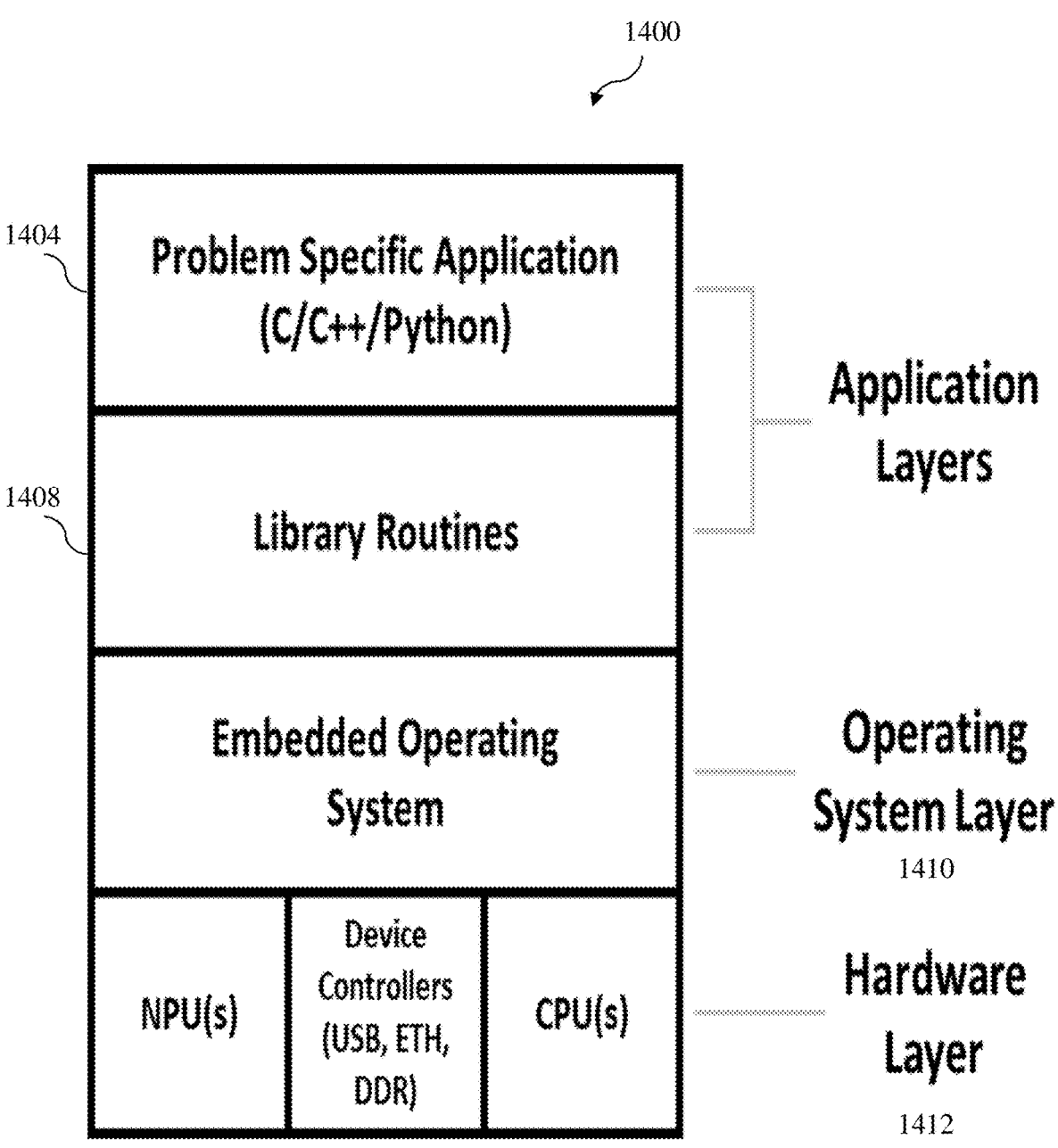
FIG. 14 depicts example operating system layers of the example neural network processor system shown in FIG. 5, according to various example embodiments of the present invention.

FIG. 14 illustrates example operating system layers 1400 of the hetero-neurocomputing system 500, according to various example embodiments of the present invention. The topmost layer may be a first application layer 1404, which is the target application of the system 500. A second application layer 1408 may include library routines and the first application layer 1404 may use library routines for computations as needed, as well as providing application programming interfaces (APIs) to make it easier and quicker to develop code. The operating system (OS) layer 1410 may include operating system software that manages or controls various hardwares in the hardware layer 1412, such as the CPUs, NPUs, device controllers, and software resources in order to provide common services for the target application.

Accordingly, various example embodiments advantageously provide a neural network processor system (neurocomputing machine) comprising a plurality of neural processing units (NPUs) having a different structural configuration, such as heterogeneous NPUs with different number of neurocores and/or neurocore size per NPU. In this regard, there may exist various conventional neuromorphic designs but they have a homogeneous architecture where every single neuron core is exactly the same. For example, various example embodiments identify that different application may require different core size. For example, a network layer with large numbers of neurons may be better mapped to a large neurocore. However, large neurocore will have inefficient hardware utilization if it is mapped with a neural network layer containing a small number of neurons. On the other hand, mapping a large neural network layer to a group of small neurocores may require splitting and merging multiple cores together, which (1) reduces hardware utilization and (2) creates lossy data transmission due to the quantization of neuron outputs (i.e. thresholding). Thus, various example embodiments implement a heterogeneous architecture with, for example, multiple core size that advantageously provides more efficient core mapping since artificial neural networks typically include multiple layers with different number of neurons/layer.

Figure 15A:
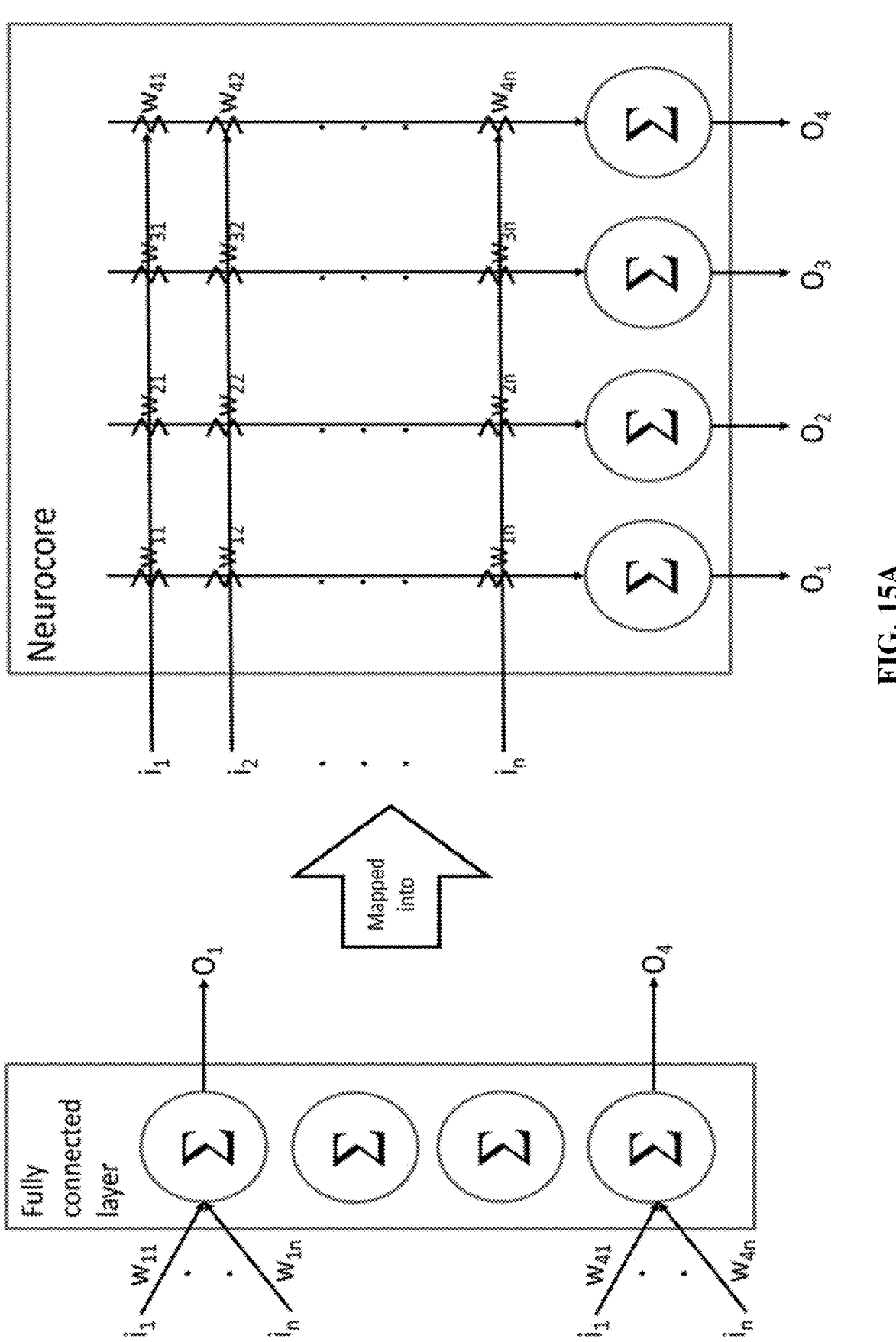
FIG. 15A depicts an exemplary mapping technique of a fully connected network layer onto a neural processing core block, according to various example embodiments of the present invention.
Figure 15B:
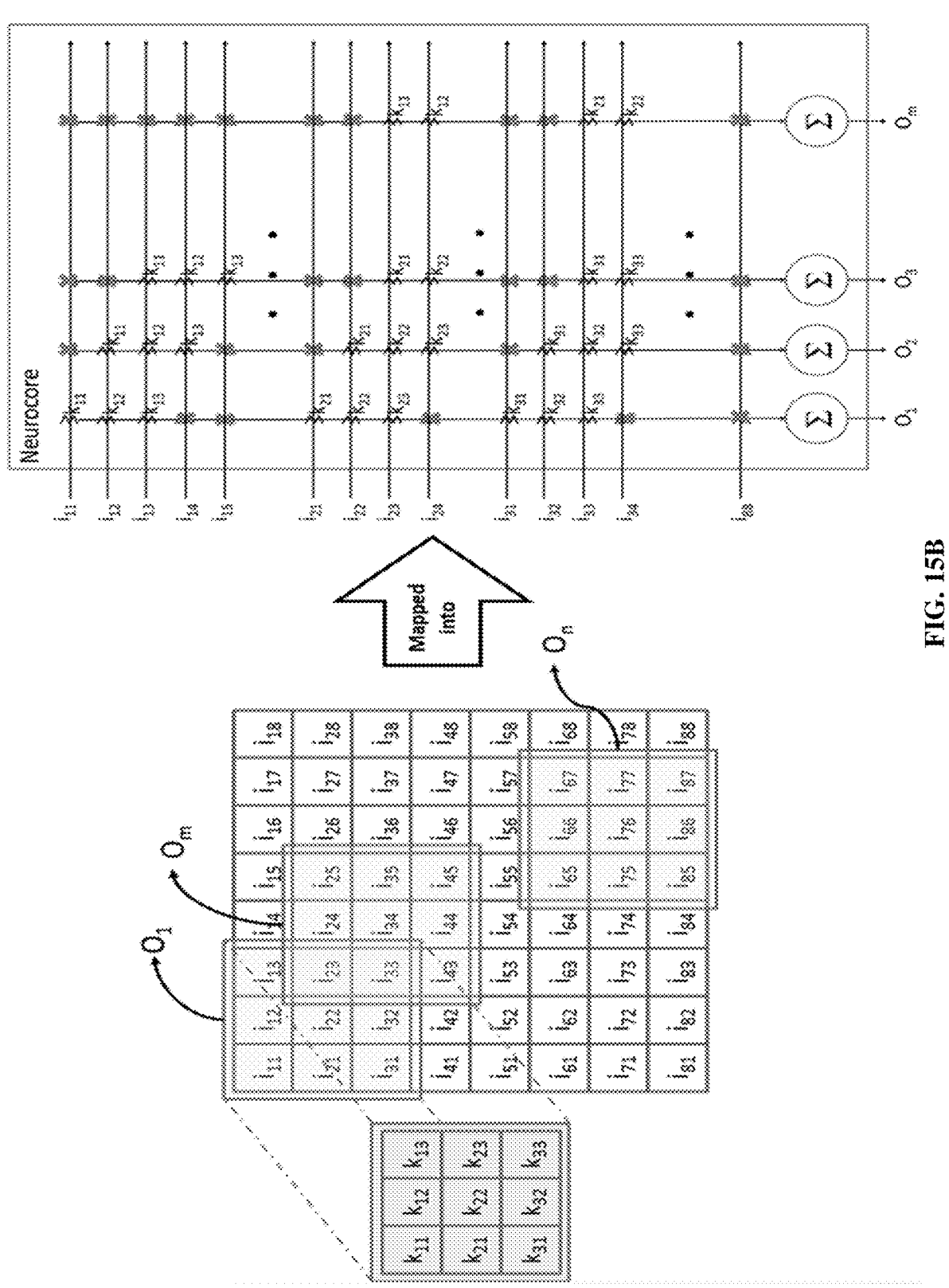
FIG. 15B depicts an exemplary mapping technique of a convolution neural network layer onto a neural processing core block, according to various example embodiments of the present invention.

Neurons may be configured to process multiply-accumulate-type operations. In existing neural network designs, such operations are found in the convolution and fully connected layers. In various example embodiments, other neural networks may be also be used or implemented so long as they require multiply-accumulate-type operations. By way of an example only and without limitation, FIG. 15A depicts a fully connected network layer and shows a possible mapping of the fully connected network layer onto a neurocore, according to various example embodiments of the present invention. As another example and without limitation, FIG. 15B depicts a convolution neural network layer and a possible mapping of the convolution neural network layer onto a neurocore, according to various example embodiments of the present invention. For example, as shown in FIG. 15B, 64 inputs may be arranged in a 2-dimensional matrix. A 3×3 kernel may be moved over the image to compute the output. For example, the output $O_1$ may be computed by placing the kernel over the top left corner of the image. It will be appreciated by a person skilled in the art that the exemplary mapping techniques shown in FIGS. 15A and 15B are for illustration purpose only and the present invention is not limited to such exemplary mapping techniques. In particular, it will be appreciated that the exemplary mapping techniques illustrated are not the only ways a neural network layer can be mapped onto the neurocore, and the graphical depiction of the neurocore in FIGS. 15A and 15B may not represent the actual internal connections. In other words, any mapping techniques as appropriate or as desired may be implemented without deviating from the scope of the present invention. For larger networks, more than one neurocore may be needed to compute all the outputs of a layer. Smaller networks may still be mapped onto multiple neurocores to fully utilise the parallelism in computations. When more than one neurocore is used, the placement of the outputs may be configured to minimise routing the same input to multiple neurocores. Accordingly, in general, mapping a neural network layer may be considered as an optimization problem that may be solved using appropriate software.

Accordingly, in various example embodiments, there is also provided a local ring oscillator with self clock gating for pseudo-asynchronous design, such as described hereinbefore with reference to FIG. 13. The combination of locally synchronous with asynchronous interfaces between blocks offers globally asynchronous operation with much lower power consumption due to reduced load on the clock tree as well as the strict timing requirement of the clock signals. Furthermore, the ring oscillator can be automatically turned on or off based on request signals from nearby blocks. This design adds one more layer of power reduction because, for example, no more power consumed on the clock tree; no more power consumed by the clock source; and the clock source with small ring oscillator designs can be quickly turned on within 1 clock cycle.

For example, when removing the global clock tree distribution and replacing it with localized clocking and power gating units (to match the block-based architectural specifications), an unexpected outcome was recorded. The system benefitted from a significant power reduction due to lesser global clock buffers, and was completely unaffected by functional glitches when communicating between cores. Glitching was resolved by the globally asynchronous router interface, which typically occurs due to differences in each router's individual clock phases.

Accordingly, in various example embodiments, there is also provided global routers at a higher hierarchy within the design for NPU to NPU communications. In this regard, in hierarchical network-on-chip architectures, global routers are advantageously provided to transmit data packages to another router outside the group (i.e., outside the neural processing unit). While the global routers may be at any position in the 2D mesh topology, it may require complex addressing mechanism. In various example embodiments, the global routers are advantageously located at the highest hierarchy of the routing layer. With this arrangement, any data package that needs to go out of the NPU will arrive at this exact location and then forwarded to the destination NPU or CPU, through another global router. This greatly simplifies the addressing mechanism of the router as well as the data packets. Furthermore, this global router can also have more FIFO internal buffer to handle much higher required bandwidth.

In various example embodiments, there is provided a neural network processor system comprising: a plurality of low power heterogeneous block-based neural processing units (NPUs), including a first neural processing unit and a second neural processing unit, whereby each neural processing unit comprises an array of neurocore blocks and is configured for performing neural network computations that are connected to each other via routers; and a central processing unit communicatively coupled to the plurality of neural processing units and configured to coordinate the plurality of neural processing units for performing neural network computations, whereby the first and second neural processing units have a different configuration to each other. In various example embodiments, each NPU includes a plurality of block-based neurocomputing cores (neurocores) with equal sizes (e.g., physical sizes); and every neurocore has its own individual clock generator. In various example embodiments, the layout of the neurocore in each NPU is a 2D array, making it block-based and thus easier to implement on hardware. In various example embodiments, each NPU further comprises a global router to facilitate communication between NPUs as well as between NPU and CPU, and a dedicated neurocache block that serves as a transient storage for intermediate/delayed neural communication, that can be configured/programmed via the CPU.

In various example embodiments, the array of neurocore blocks comprises a plurality of neurocore blocks configured to perform in-memory matrix computation task, whereby each of the plurality of neurocore blocks comprises of a power gating unit and a clock generator block. Furthermore, the neurocore blocks are capable of self power and clock gating by intelligently aggregating and recognizing idle states, significantly reducing power consumption.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A neural network processor system comprising:
   a plurality of neural processing units, including a first neural processing unit and a second neural processing unit, wherein each neural processing unit comprises an array of neural processing core blocks, each neural processing core block comprising a neural processing core;
   at least one central processing unit communicatively coupled to the plurality of neural processing units and configured to coordinate the plurality of neural processing units for performing neural network computations,
   the first and second neural processing units being accelerators having a different structural configuration to each other, the different structural configuration being at least one of different numbers of neural processing core blocks and different numbers of neural processing cores, such that each neural network task is assigned to one or more of the plurality of neural processing units based on the structural configuration of the one or more neural processing units, with respect to a number of neurons of a network layer associated with the neural network task;

a fabric bridge, wherein the at least one central processing unit is communicatively coupled to the plurality of neural processing units via the fabric bridge;

a router network, wherein the at least one central processing unit is communicatively coupled to the plurality of neural processing units further based on the router network, wherein the router network comprises a plurality of router subnetworks associated with the plurality of neural processing units, respectively, and each of the plurality of router subnetworks comprises a plurality of routers communicatively coupled to the plurality of neural processing cores, respectively, of the neural processing unit associated therewith;

wherein the router network further comprises a plurality of global routers associated with the plurality of neural processing units, respectively, the plurality of global routers being communicatively coupled to the plurality of router subnetworks associated with the plurality of neural processing units, respectively, and the router network is configured to route neural data to and/or from each of the plurality of neural processing units via the respective global router associated therewith;

wherein each neural processing core block of each neural processing unit has an asynchronous interface, such that the plurality of routers of each of the plurality of router subnetworks are each configured to communicate with neighboring routers and the corresponding neural processing core based on an asynchronous interface protocol; and wherein each neural processing core block of each neural processing unit is locally synchronous and each router of the plurality of routers is locally synchronous.

2. The neural network processor system according to claim 1, further comprising a plurality of fabric bridges, wherein the at least one central processing unit is communicatively coupled to the plurality of neural processing units via the plurality of fabric bridges, respectively.

3. The neural network processor system according to claim 1, wherein each of the plurality of neural processing units further comprises a neural cache block, the neural cache block comprises a memory buffer configured to buffer neural data.

4. The neural network processor system according to claim 3, the neural cache block further comprises a spike generator configured to generate time-based ordered spike data based on an input data from the central processing unit and transmit the time-based ordered spike data to the memory buffer for storage therein and subsequent transmission.

5. The neural network processor system according to claim 4, wherein each neural processing core of each neural processing unit comprises:

a memory synapse array configured to perform in-memory neural network computations.

6. The neural network processor system according to claim 4, wherein each neural processing core block of each neural processing unit further comprises a local clock generator configured to perform self clock gating operations.

7. The neural network processor system according to claim 6, wherein each neural processing core block of each neural processing unit further comprises a local power gating structure configured to control power supply to the neural processing core therein.

8. The neural network processor system according to claim 6, wherein each neural processing core block of each neural processing unit is configured to be operable in a plurality of operating modes, comprising a disabled mode, a standby mode and an active mode.

9. The neural network processor system, wherein in each of the plurality of neural processing units, the array of neural processing core blocks is a two-dimensional array and each neural processing core block has an associated unique address based on its position in the two-dimensional array.

10. A method of operating a neural network processor system, the neural network processor system comprising:

a plurality of neural processing units, including a first neural processing unit and a second neural processing unit, wherein each neural processing unit comprises an array of neural processing core blocks, each neural processing core block comprising a neural processing core; and at least one central processing unit communicatively coupled to the plurality of neural processing units and configured to coordinate the plurality of neural processing units for performing neural network computations, wherein the first and second neural processing units are accelerators having a different structural configuration to each other, the different structural configuration being at least one of different numbers of neural processing core blocks and different numbers of neural processing cores; and the method comprising:

executing, by the at least one central processing unit, one or more neural network applications;

assigning, by the at least one central processing unit, a plurality of neural network tasks obtained from the one or more neural network applications to the plurality of neural processing units;

wherein each of the plurality of neural network tasks is assigned to one or more of the plurality of neural processing units for performing neural network computations associated with the neural network tasks based on the structural configuration of the one or more neural processing units, with respect to a number of neurons of a network layer associated with the neural network task;

wherein the neural network processor system also comprises:

a fabric bridge, wherein the at least one central processing unit is communicatively coupled to the plurality of neural processing units via the fabric bridge;

a router network, wherein the at least one central processing unit is communicatively coupled to the plurality of neural processing units further based on the router network, wherein the router network comprises a plurality of router subnetworks associated with the plurality of neural processing units, respectively, and each of the plurality of router subnetworks comprises a plurality of routers communicatively coupled to the plurality of neural processing cores, respectively, of the neural processing unit associated therewith;

wherein the router network further comprises a plurality of global routers associated with the plurality of neural processing units, respectively, the plurality of global routers being communicatively coupled to the plurality of router subnetworks associated with the plurality of neural processing units, respectively, and the router network is configured to route neural data to and/or from each of the plurality of neural processing units via the respective global router associated therewith;

wherein each neural processing core block of each neural processing unit has an asynchronous interface, such that the plurality of routers of each of the plurality of router subnetworks are each configured to communicate with neighboring routers and the corresponding neural processing core based on an asynchronous interface protocol; and wherein each neural processing core block of each neural processing unit is locally synchronous and each router of the plurality of routers is locally synchronous.

11. A method of forming a neural network processor system, the method comprising:

forming a plurality of neural processing units, including a first neural processing unit and a second neural processing unit, wherein each neural processing unit comprises an array of neural processing core blocks, each neural processing core block comprising a neural processing core; and forming at least one central processing unit communicatively coupled to the plurality of neural processing units and configured to coordinate the plurality of neural processing units for performing neural network computations, the first and second neural processing units are accelerators having a different structural configuration to each other, the different structural configuration being at least one of different numbers of neural processing core blocks and different numbers of neural processing cores, such that each neural network task is assigned to one or more of the plurality of neural processing units based on the structural configuration of the one or more neural processing units, with respect to a number of neurons of a network layer associated with the neural network task;

forming a fabric bridge, wherein the at least one central processing unit is communicatively coupled to the plurality of neural processing units via the fabric bridge;

forming a router network, wherein the at least one central processing unit is communicatively coupled to the plurality of neural processing units further based on the router network, wherein the router network comprises a plurality of router subnetworks associated with the plurality of neural processing units, respectively, and each of the plurality of router subnetworks comprises a plurality of routers communicatively coupled to the plurality of neural processing cores, respectively, of the neural processing unit associated therewith;

wherein the router network further comprises a plurality of global routers associated with the plurality of neural processing units, respectively, the plurality of global routers being communicatively coupled to the plurality of router subnetworks associated with the plurality of neural processing units, respectively, and the router network is configured to route neural data to and/or from each of the plurality of neural processing units via the respective global router associated therewith;

wherein each neural processing core block of each neural processing unit has an asynchronous interface, such that the plurality of routers of each of the plurality of router subnetworks are each configured to communicate with neighboring routers and the corresponding neural processing core based on an asynchronous interface protocol; and wherein each neural processing core block of each neural processing unit is locally synchronous and each router of the plurality of routers is locally synchronous.

\* \* \* \* \*